US012164254B2

(12) United States Patent
Mitsumata

(10) Patent No.: US 12,164,254 B2
(45) Date of Patent: Dec. 10, 2024

(54) IMAGE FORMING APPARATUS HAVING A PIVOTABLE BELT UNIT

(71) Applicant: CANON KABUSHIKI KAISHA, Tokyo (JP)

(72) Inventor: Akinori Mitsumata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/126,231

(22) Filed: Mar. 24, 2023

(65) Prior Publication Data

US 2023/0324832 A1 Oct. 12, 2023

(30) Foreign Application Priority Data

Apr. 7, 2022 (JP) ................................ 2022-064112

(51) Int. Cl.

| | |
|---|---|
| ***G03G 15/00*** | (2006.01) |
| ***G03G 15/01*** | (2006.01) |
| ***G03G 15/16*** | (2006.01) |

(52) U.S. Cl.

CPC ..... *G03G 15/5058* (2013.01); *G03G 15/0136* (2013.01); *G03G 15/1615* (2013.01); *G03G 15/5054* (2013.01); *G03G 2215/00059* (2013.01)

(58) Field of Classification Search

CPC ............. G03G 15/0189; G03G 15/161; G03G 15/1615; G03G 15/5054; G03G 15/5058; G03G 15/556; G03G 21/168; G03G 2215/0016; G03G 2215/0122; G03G 2215/0158; G03G 2215/00059; G03G 15/0136

USPC ..................................... 399/49, 74, 302, 308

See application file for complete search history.

(56) References Cited

U.S. PATENT DOCUMENTS

| | | | | |
|---|---|---|---|---|
| 7,657,196 | B2 * | 2/2010 | Yamaguchi ........ | G03G 15/5054 399/49 |
| 8,315,538 | B2 | 11/2012 | Takei | |
| 8,577,266 | B2 | 11/2013 | Shiba et al. | |
| 8,731,418 | B2 | 5/2014 | Hosohara et al. | |
| 10,295,953 | B2 | 5/2019 | Watanabe et al. | |
| 2009/0129830 | A1 * | 5/2009 | Adachi ................ | G03G 15/161 399/308 |
| 2009/0190954 | A1 * | 7/2009 | Okabe .................. | G03G 15/161 399/121 |

(Continued)

FOREIGN PATENT DOCUMENTS

| | | | |
|---|---|---|---|
| JP | 2009-075479 | A | 4/2009 |
| JP | 2011-191679 | A | 9/2011 |

(Continued)

*Primary Examiner* — Robert B Beatty

(74) *Attorney, Agent, or Firm* — Venable LLP

(57) ABSTRACT

An image forming apparatus includes an apparatus body having a body frame, an image bearing member, a belt unit including a belt, and a stretching member configured to stretch the belt, the belt unit being pivotable around a first pivot axis between a first position and a second position, a transfer unit, and a detection unit movably supported by the body frame. The detection unit is configured to pivot around a second pivot axis different from the first pivot axis with respect to the body frame so as not to hinder pivoting of the belt unit in conjunction with a pivoting operation in which the belt unit pivots from the first position to the second position.

24 Claims, 16 Drawing Sheets

(56) References Cited

U.S. PATENT DOCUMENTS

| | | | | |
|---|---|---|---|---|
| 2014/0144759 | A1* | 5/2014 | Kawanami | G03G 15/1615<br>198/813 |
| 2015/0220033 | A1* | 8/2015 | Shiga | G03G 15/0194<br>399/74 |
| 2023/0305443 | A1* | 9/2023 | Tejima | G03G 15/1605 |

FOREIGN PATENT DOCUMENTS

| | | | |
|---|---|---|---|
| JP | 2012-128403 | A | 7/2012 |
| JP | 2014-106483 | A | 6/2014 |
| JP | 2018-081194 | A | 5/2018 |

* cited by examiner

IMAGE FORMING APPARATUS HAVING A PIVOTABLE BELT UNIT

BACKGROUND OF THE INVENTION

Field of the Invention

The present invention relates to an image forming apparatus that forms an image on a sheet.

Description of the Related Art

JP 2018-81194 A proposes an image forming apparatus including a cartridge support member that can support a plurality of cartridges and can be drawn out from an apparatus body, and an intermediate transfer belt unit that moves in conjunction with opening and closing of a door. When the door is opened, the intermediate transfer belt unit moves so that the intermediate transfer belt is away from the drum of each cartridge supported by the cartridge support member.

JP 2014-106483 A proposes an image forming apparatus including an intermediate transfer belt unit including an intermediate transfer belt capable of bearing a set of toner patches and a tension roller that applies tension to the intermediate transfer belt, and a sensor unit that detects the set of toner patches. The sensor unit is swingably supported by a sensor unit support shaft provided in the apparatus body of the image forming apparatus.

For example, it is assumed that an intermediate transfer belt unit described in JP 2014-106483 A is configured to be movable up and down so as to be capable of coming into contact with and separating from a drum of a cartridge as in the intermediate transfer belt unit described in JP 2018-81194 A. At this time, since the sensor unit swing shaft extends in the substantially horizontal direction, when the intermediate transfer belt unit moves up and down, a large load is applied to the sensor unit swing shaft, the sensor unit, and the intermediate transfer belt unit. As a result, the sensor unit swing shaft, the sensor unit, and the intermediate transfer belt unit may be deformed or damaged.

SUMMARY OF THE INVENTION

According to a first aspect of the present invention, an image forming apparatus includes an apparatus body having a body frame, an image bearing member configured to bear a toner image, a belt unit including a belt that is a rotatable endless belt and to which the toner image borne on the image bearing member is primarily transferred, and a stretching member configured to stretch the belt, the belt unit being pivotable around a first pivot axis between a first position where the belt and the image bearing member are in contact with each other and a second position where the belt is away from the image bearing member, a transfer unit configured to transfer the toner image borne on the belt to a sheet, and a detection unit movably supported by the body frame and configured to detect the toner image on the belt. The detection unit is configured to pivot around a second pivot axis different from the first pivot axis with respect to the body frame so as not to hinder pivoting of the belt unit in conjunction with a pivoting operation in which the belt unit pivots from the first position to the second position.

According to a second aspect of the present invention, an image forming apparatus includes an apparatus body having a body frame, an image bearing member configured to bear a toner image, a belt unit including a belt that is a rotatable endless belt and to which the toner image borne on the image bearing member is primarily transferred, a first stretching member and a second stretching member configured to stretch the belt, and a belt shift adjustment mechanism configured to adjust a shift of the belt by inclining the first stretching member with respect to the second stretching member, the belt unit being movable between a first position where the belt and the image bearing member are in contact with each other and a second position where the belt is away from the image bearing member, a transfer unit configured to transfer the toner image borne on the belt to a sheet, and a detection unit movably supported by the body frame and configured to detect the toner image on the belt. The detection unit is engaged with the first stretching member in a state where the belt unit is located at the first position, and moves with respect to the body frame so as not to hinder a movement of the belt unit in conjunction with a moving operation in which the belt unit moves from the first position to the second position.

Further features of the present invention will become apparent from the following description of exemplary embodiments with reference to the attached drawings.

DESCRIPTION OF THE EMBODIMENTS

Figure 1:
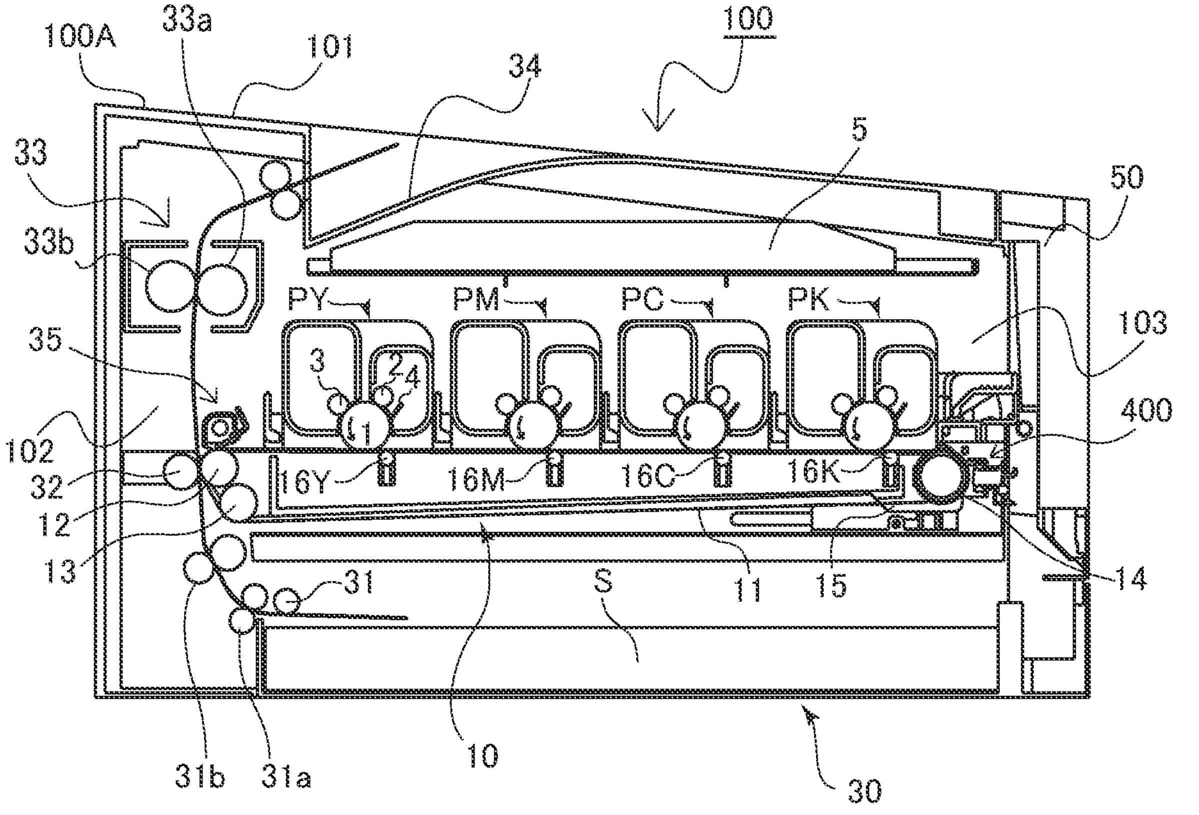
FIG. 1 is an overall schematic diagram showing a printer according to the first embodiment.

Hereinafter, embodiments of the present invention will be exemplarily described in detail with reference to the drawings. However, the dimensions, materials, shapes, relative arrangements, and the like of the components described in the following embodiments should be appropriately changed according to the configuration of the apparatus to which the present invention is applied and various conditions. Therefore, unless otherwise specified, the scope of the present invention is not intended to be limited thereto. In each drawing, peripheral components unnecessary for description are not shown as appropriate.

Here, an electrophotographic image forming apparatus (hereinafter, an image forming apparatus) forms an image on a recording material using an electrophotographic image forming process. Examples of the image forming apparatus include an electrophotographic copying machine, an electrophotographic printer, a facsimile machine, and a word processor. The image forming apparatus includes both monochrome and color.

The cartridge is, for example, a process cartridge or a development cartridge, and is detachable from the apparatus body of the image forming apparatus. This cartridge contributes to an image forming process of forming an image on a recording material in a state of being attached to the apparatus body of the image forming apparatus. Here, the process cartridge is a cartridge in which at least one of the charging unit, the developing unit, and the cleaning unit as the process unit and the photosensitive member drum are integrally formed, and detachably attached to the apparatus body of the image forming apparatus.

Therefore, the process cartridge includes a cartridge in which a developing unit as a process unit and a photosensitive member drum are integrally formed into a cartridge and detachably attached to the apparatus body of the image forming apparatus. In addition, the process cartridge includes a process cartridge in which a charging unit, a developing unit, or a cleaning unit as a process unit and a photosensitive member drum are integrally formed into a cartridge and detachably attached to the apparatus body. Note that a process cartridge integrally including the photosensitive member drum and the developing unit is referred to as a so-called integrated type. In addition, a process cartridge integrally including the photosensitive member drum and a process unit other than the developing unit is referred to as a so-called separation type.

Here, the process cartridge can be attached to and detached from the apparatus body of the image forming apparatus by the user himself/herself. Therefore, maintenance of the image forming apparatus can be easily performed. The process unit acts on the photosensitive member drum.

In addition, the development cartridge includes a developing roller, stores developer (toner) used to develop the electrostatic latent image formed on the photosensitive member drum by the developing roller, and is detachably attached to the apparatus body. In the case of the development cartridge, the photosensitive member drum is attached to the apparatus body or a cartridge support member (described later). Alternatively, the photosensitive member drum is provided in a separate process cartridge (in this case, the process cartridge does not have a developing unit). Note that the development cartridge can also be attached to and detached from the apparatus body by the user himself/herself. Therefore, maintenance of the image forming apparatus can be easily performed.

Therefore, the cartridge includes an integrated or separate process cartridge. In addition, the cartridge includes a cartridge in which a separation-type process cartridge and a development cartridge are used as a pair. Further, in the cartridge, the photosensitive member drum is fixedly attached to the apparatus body or a cartridge support member (described later). Further, there is a case where the development cartridge is detachably attached to the cartridge support member so as to be capable of acting on the photosensitive member drum. Furthermore, the sheet as the recording material is a sheet on which an image is formed by an image forming apparatus, and includes, for example, a paper sheet, an overhead projector (OHP) sheet, and the like.

First Embodiment

Overall Configuration

First, the first embodiment of the present invention will be described. A printer 100 as the image forming apparatus according to the first embodiment is an electrophotographic system laser beam printer. As shown in FIG. 1, the printer 100 includes an intermediate transfer belt unit 10 serving as a belt unit, a cartridge support body 60 (see FIGS. 7A and 7B), four process cartridges PY, PM, PC, and PK, and a laser scanner 5. The printer 100 includes a feeding unit 30, a fuser 33, and a sensor unit 400 serving as a detection unit.

The printer 100 further includes an apparatus body 100A including an exterior 101 and a body frame 102, and a front door 50 openably and closably supported by the body frame 102. A cartridge accommodation unit 103 that accommodates the cartridge support body 60 and the process cartridges PY, PM, PC, and PK is provided inside the printer 100.

The four process cartridges PY, PM, PC, and PK as cartridges are supported by the cartridge support body 60, and form toner images of four colors of yellow (Y), magenta (M), cyan (C), and black (K), respectively. Note that the four process cartridges PY, PM, PC, and PK have the same configuration except that colors of images to be formed are different. Therefore, only the configuration of the process cartridge PY and the image forming process will be described, and the description of the process cartridges PM, PC, and PK will be omitted.

The process cartridge PY includes a photosensitive drum 1 serving as an image bearing member that bears a toner image, a charging roller 2, a developing roller 3, and a cleaning blade 4. The photosensitive drum 1 is configured by applying an organic photoconductive layer to the outer periphery of an aluminum cylinder, and is rotated by a drive motor (not shown). That is, each process cartridge is a so-called integrated process cartridge including the photosensitive drum 1 and the charging roller 2, the developing roller 3, and the cleaning blade 4 serving as a process unit acting on the photosensitive drum 1.

Figure 2:
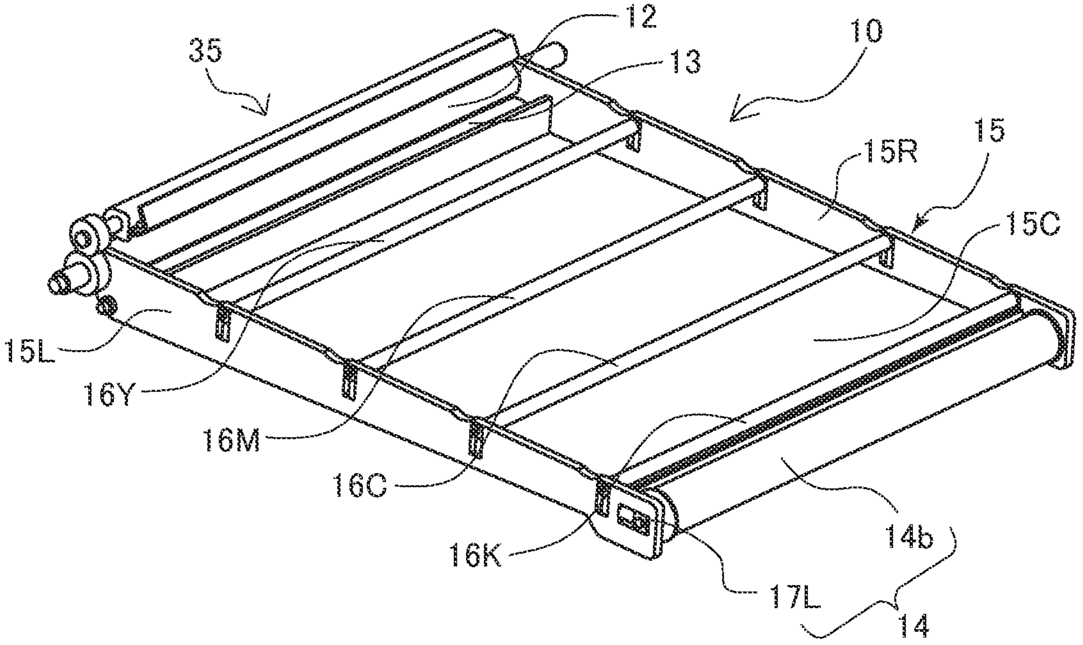
FIG. 2 is a perspective diagram showing an intermediate transfer belt unit.

As shown in FIGS. 1 and 2, the intermediate transfer belt unit 10 includes an intermediate transfer belt 11, a driving roller 12, a driven roller 13, a tension roller 14, a frame member 15, and primary transfer rollers 16Y, 16M, 16C, and 16K. The intermediate transfer belt 11 serving as a belt is a rotatable endless belt, is stretched by the driving roller 12, the driven roller 13, and the tension roller 14, and is rotated by the driving roller 12. The frame member 15 includes a central frame 15C and side plate frames 15L and 15R, and the side plate frames 15L and 15R rotatably support the driving roller 12, the driven roller 13, and the tension roller 14. The primary transfer rollers 16Y, 16M, 16C, and 16K as primary transfer units are provided inside the intermediate transfer belt 11.

The sensor unit 400 is disposed at a position facing the stretching member serving as a tension roller 14 and a first stretching member via the intermediate transfer belt 11. The sensor unit 400 can detect information about a toner patch that is a toner image transferred to the intermediate transfer belt 11, and can detect, for example, the density of the toner patch. The control unit provided in the printer 100 can control the process cartridges PY, PM. PC, and PK and the laser scanner 5 according to the result of detection by the sensor unit 400 to control the density of the toner image.

The fuser 33 includes a fixing film 33*a* heated by a heater, and a pressure roller 33*b* in pressure contact with the fixing film 33*a*. The feeding unit 30 is provided in a lower portion of the printer 100 and houses a sheet S. The feeding unit 30 includes a pickup roller 31 that feeds the sheet S.

Next, an image forming operation of the printer 100 configured as described above will be described. When an image signal is input to the laser scanner 5 from a personal computer (not shown) or the like, the photosensitive drum 1 of the process cartridge PY is irradiated with a laser beam corresponding to the image signal from the laser scanner 5.

At this time, the surface of the photosensitive drum 1 is uniformly charged in advance to a predetermined polarity and potential by the charging roller 2, and an electrostatic latent image is formed on the surface by being irradiated with a laser beam from the laser scanner 5. The electrostatic latent image formed on the photosensitive drum 1 is developed by the developing roller 3, and a yellow (Y) toner image is formed on the photosensitive drum 1.

Similarly, each of the photosensitive drums of the process cartridges PM, PC, and PK is also irradiated with a laser beam from the laser scanner 5, and toner images of magenta (M), cyan (C), and black (K) are formed on respective photosensitive drums. The toner images of the colors formed on respective photosensitive drums are transferred to the intermediate transfer belt 11 by the primary transfer rollers 16Y, 16M, 16C, and 16K, and are conveyed to a secondary transfer roller 32 by the intermediate transfer belt 11 rotating by the driving roller 12. The toner remaining on the photosensitive drum 1 after the toner image is transferred to the intermediate transfer belt 11 is collected by the cleaning blade 4. The image forming process of each color is performed at the timing of superimposing the toner image on the upstream toner image primarily transferred onto the intermediate transfer belt 11.

In parallel with this image forming process, the sheets S accommodated in the feeding unit 30 are sent out by the pickup roller 31 and then separated one by one by a separation roller pair 31*a*. Then, the full-color toner image on the intermediate transfer belt 11 is transferred to the sheet S conveyed by the separation roller pair 31*a* and a conveyance roller pair 31*b* by the secondary transfer bias applied to the secondary transfer roller 32 serving as a transfer unit and a secondary transfer unit. The toner remaining on the intermediate transfer belt 11 is removed by the belt cleaning unit 35.

Predetermined heat and pressure are applied to the sheet S to which the toner image has been transferred by the fixing film 33*a* and the pressure roller 33*b* of the fuser 33, and the toner is melted and fixed (fixed). The sheet S having passed through the fuser 33 is discharged to the discharge tray 34 by a discharge roller pair 34*a*.

In the following description, regarding the printer 100, the front side (front side) is a side on which the front door 50 is disposed. The rear side (back side) is the opposite side. The front-rear direction is a direction from the rear side to the front side of the printer 100 (front direction) and the opposite direction (rear direction). The left and right are left or right when the printer 100 is viewed from the front side. The left-right direction is a direction from right to left (left direction) and the opposite direction (right direction). Upper and lower are upper and lower in the direction of gravity. The upward direction is a direction from the bottom to the top, and the downward direction is a direction from the top to the bottom.

In the description of the present embodiment, "L" or "R" at the end of the reference numeral is basically a pair of left and right members provided on the left and right sides of the printer 100. Further, "L" at the end of the reference numeral indicates a left member of the pair of left and right members, and "R" at the end of the reference numeral indicates a right member of the pair of left and right members. Hereinafter, with respect to a member to which "L" or "R" is added at the end of such reference numerals, only one of them will be described, and the description of the other may be omitted.

Surrounding Configuration of Front Door

Figure 3A:
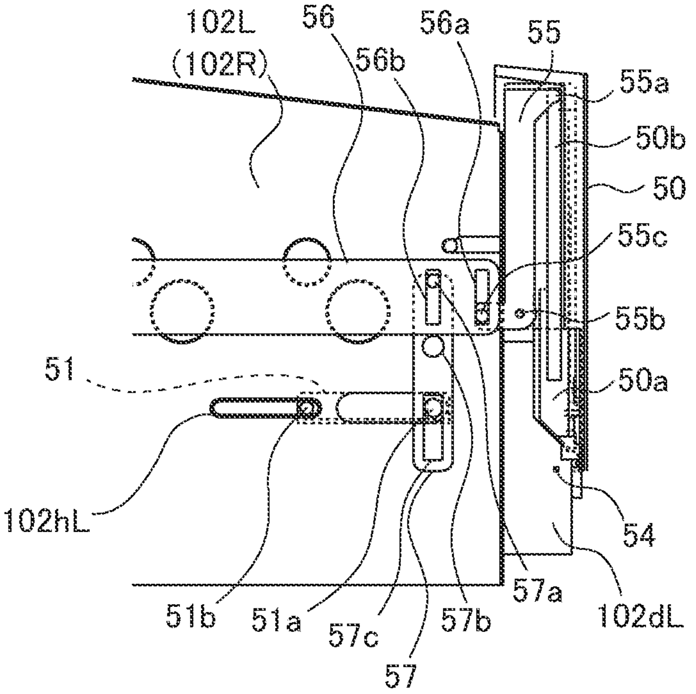
FIG. 3A is a cross-sectional diagram showing a front door and a surrounding configuration thereof.
Figure 3B:
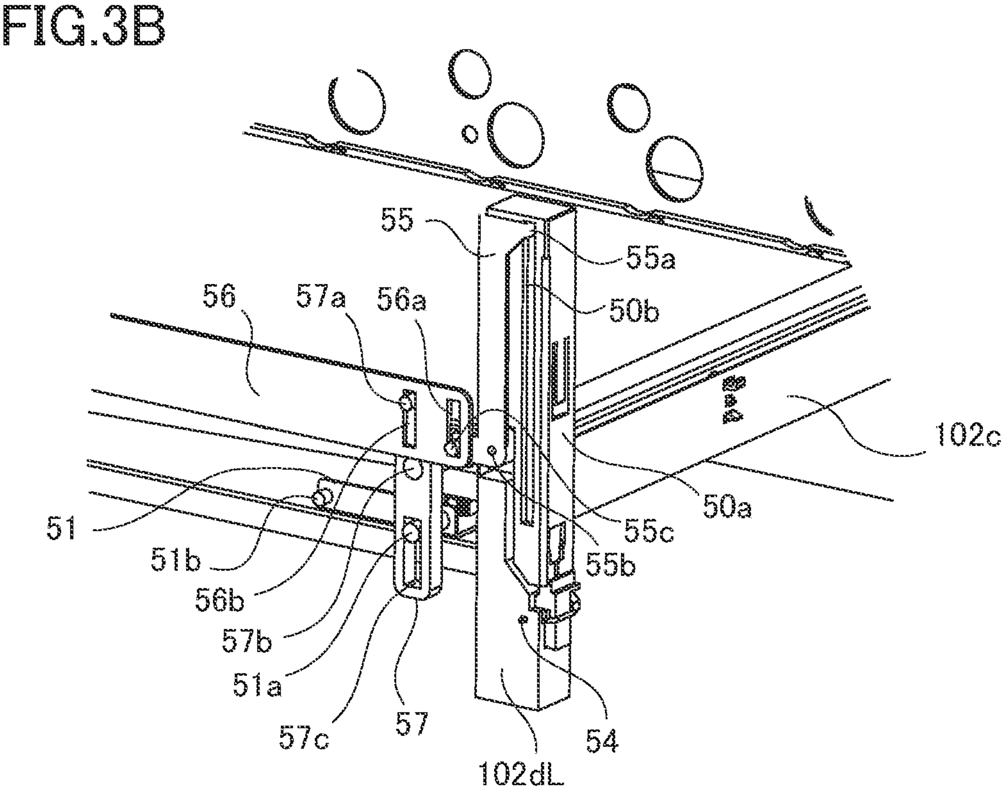
FIG. 3B is a perspective diagram showing the front door and the surrounding configuration thereof.
Figure 4A:
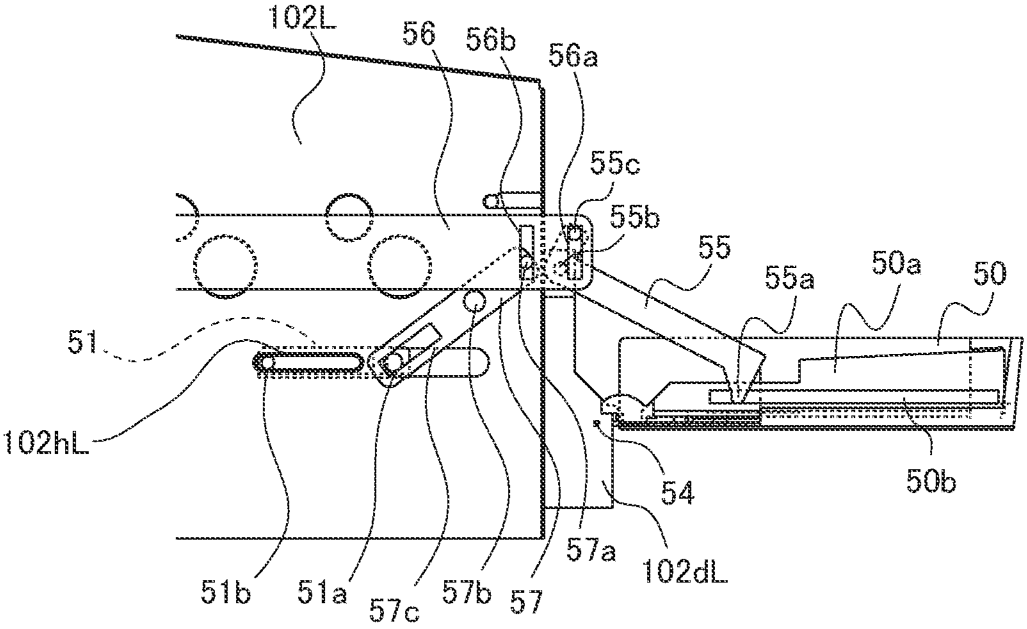
FIG. 4A is a cross-sectional diagram showing an interlocking configuration of a front door and a slide member.
Figure 4B:
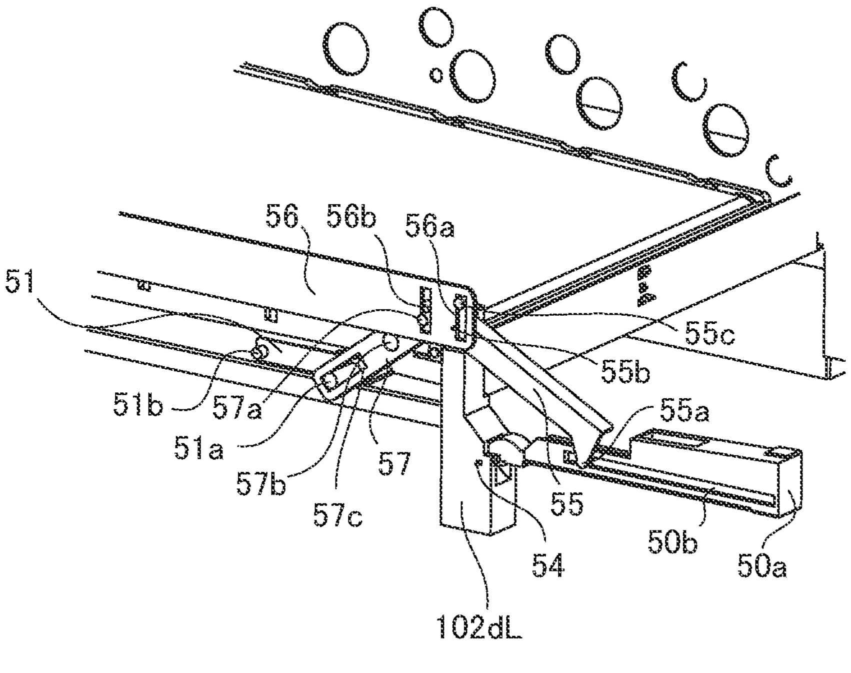
FIG. 4B is a perspective diagram showing an interlocking configuration of the front door and the slide member.

Next, the front door 50 and its surrounding configuration will be described with reference to FIGS. 3A to 4B. More specifically, a configuration that interlocks by opening and closing front door 50 will be described. As shown in FIGS. 3A and 3B, the body frame 102 includes a left side plate 102L, a right side plate 102R, a left guide member 102*d*L, a right guide member 102*d*R, and a beam portion 102*c*. The left side plate 102L is provided on the left side of the printer 100, and the right side plate 102R is provided on the right side of the printer 100. The left side plate 102L and the right side plate 102R extend in the vertical direction and the front-rear direction.

The left guide member 102*d*L is fixed to the front side of the left side plate 102L, and the right guide member 102*d*R is fixed to the front side of the right side plate 102R. The left guide member 102*d*L and the right guide member 102*d*R extend in a columnar shape in the vertical direction. The beam portion 102*c* extends in the left-right direction so as to connect the left guide member 102*d*L and the right guide member 102*d*R.

Since the configuration interlocked with the front door 50 described below is provided substantially symmetrically on the left side and the right side of the printer 100, only the left side of the printer 100 will be described, and the description of the right side of the printer 100 will be omitted.

A first link member 56 is slidably supported by the left side plate 102L in the front-rear direction, and the first link member 56 has long holes 56*a* and 56*b* extending in the vertical direction. The left side plate 102L has a long hole 102*h*L extending in the front-rear direction, and a slide member 51 is slidably supported in the front-rear direction. The slide member 51 includes a shaft portion 51*b* engaged with the long hole 102*h*L and a shaft portion 51*a* provided ahead of the shaft portion 51*b*.

The first link member 56 and the slide member 51 are connected by a second link member 57. More specifically, the second link member 57 includes a shaft portion 57*a* engaged with a long hole 56*b* of the first link member 56 and a long hole 57*c* engaged with the shaft portion 51*a* of the slide member 51, and is pivotably supported by the left side plate 102L around a pivot shaft 57*b*.

A door guide 50*a* is fixed to the front door 50 serving as a door portion, and the door guide 50*a* has along hole 50*b*. The door guide 50*a* is provided integrally with the front door 50 and is pivotably supported by the left guide member 102*d*L by a hinge shaft 54. That is, the front door 50 is openably and closably supported by the body frame 102 around the hinge shaft 54.

The door guide 50*a* and the first link member 56 are connected by a coupling arm 55. More specifically, the coupling arm 55 includes a shaft portion 55*c* engaged with a long hole 56*a* of the first link member 56 and a shaft portion 55*a* engaged with the long hole 50*b* of the door guide 50*a*, and is pivotably supported by the left guide member 102*d*L around a coupling arm shaft 55*b*.

As shown in FIGS. 3A to 4B, when the front door 50 is opened, the shaft portion 55*a* of the coupling arm 55 moves along the long hole 50*b* of the door guide 50*a* fixed to the front door 50. As a result, the coupling arm 55 pivots clockwise around the coupling arm shaft 55*b* as shown in FIG. 4A. When the coupling arm 55 pivots, the shaft portion 55*c* of the coupling arm 55 moves upward along the long hole 56*a* of the first link member 56, and at this time, the first link member 56 is pulled toward the front side of the printer 100 by the shaft portion 55*c* and slides forward. The pivot angle of the coupling arm 55 is restricted within a range where the shaft portion 55*c* can move through the long hole 56*a*, whereby the open angle of the front door 50 is determined. That is, when the shaft portion 55*c* contacts the upper end of the long hole 56*a*, the front door 50 is stably held in the open state.

As the first link member 56 slides forward, the second link member 57 pivots clockwise around the pivot shaft 57*b* due to the engagement between the shaft portion 57*a* and the long hole 56*b*. When the second link member 57 pivots clockwise, the slide member 51 slides toward the rear side of the printer 100 due to the engagement between the shaft portion 51*a* and the long hole 57*c*. The pivot angle of the second link member 57 is restricted within a range in which the shaft portion 57*a* can move through the long hole 56*b*, whereby a slidable range of the slide member 51 is determined.

When the front door 50 is closed from the open position to the closed position, the coupling arm 55, the first link member 56, and the second link member 57 move in a direction opposite to the above-described operation, and the slide member 51 slides toward the front side of the printer 100. Here, the position of the slide member 51 when the front door 50 is closed with respect to the apparatus body 100A is defined as a first slide position (see FIG. 3A), and the position of the slide member 51 when the front door 50 is opened with respect to the apparatus body 100A is defined as a second slide position (see FIG. 4A). As the slide member 51 moves in the front-rear direction, the intermediate transfer belt 11 moves between the first position where an image can be formed and the second position where an image cannot be formed, as described later. That is, the slide member 51, the coupling arm 55, the first link member 56, and the second link member 57 constitute an interlocking portion that causes the intermediate transfer belt unit 10 including the intermediate transfer belt 11 to perform a pivoting operation (also referred to as a moving operation) to be described later in conjunction with the opening of the front door 50 with respect to the apparatus body 100A.

Note that the first link member 56 (56L) on the left side of the printer 100 also serves as a mechanism for releasing conduction (connection) of the printer 100 to the electrical contact of each process cartridge in conjunction with the opening operation of the front door 50. In addition, the first link member 56 (56R) on the right side of the printer 100 also serves as a mechanism for releasing the coupling between each process cartridge and the drive on the apparatus body 100A side in conjunction with the opening operation of the front door 50.

Intermediate Transfer Belt Unit

Next, the intermediate transfer belt unit 10 will be described in detail with reference to FIGS. 5 to 7B. Since the intermediate transfer belt unit 10 is provided substantially symmetrically as shown in FIG. 2, only the left side of the intermediate transfer belt unit 10 will be described, and the description of the right side of the intermediate transfer belt unit 10 will be omitted.

Figure 5:
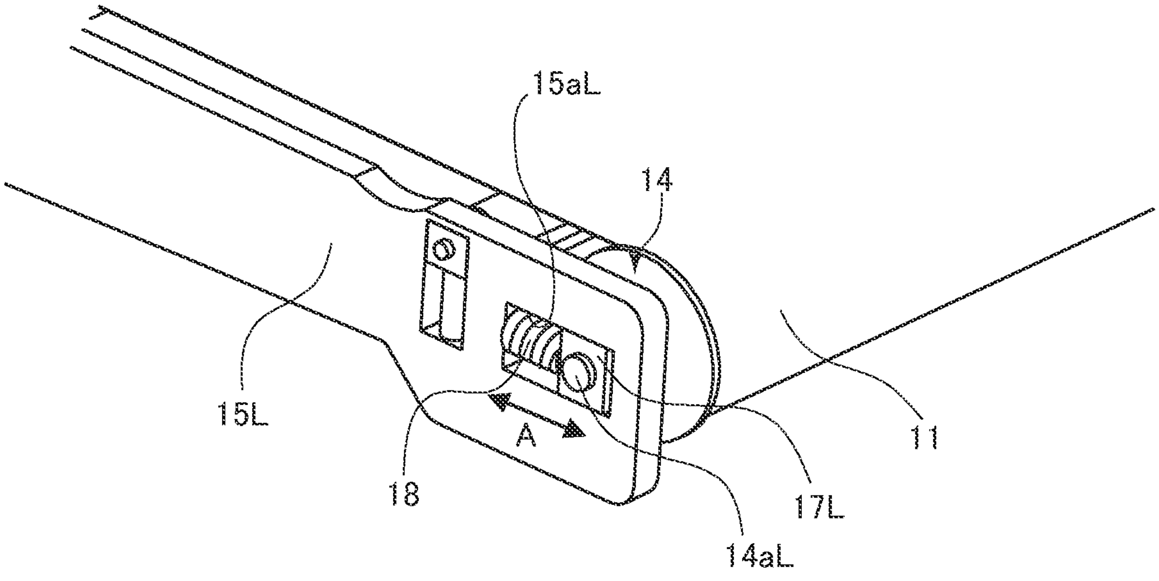
FIG. 5 is a perspective diagram showing a configuration for biasing a tension roller.

As shown in FIG. 5, a side plate frame 15L of the intermediate transfer belt unit 10 has a long hole 15*a*L, and a tension roller bearing 17L is movably supported by the long hole 15*a*L in a longitudinal direction A of the long hole 15*a*L. The long hole 15*a*L extends substantially in the front-rear direction when the intermediate transfer belt unit 10 is located at the first position (see FIG. 1).

Figure 10:
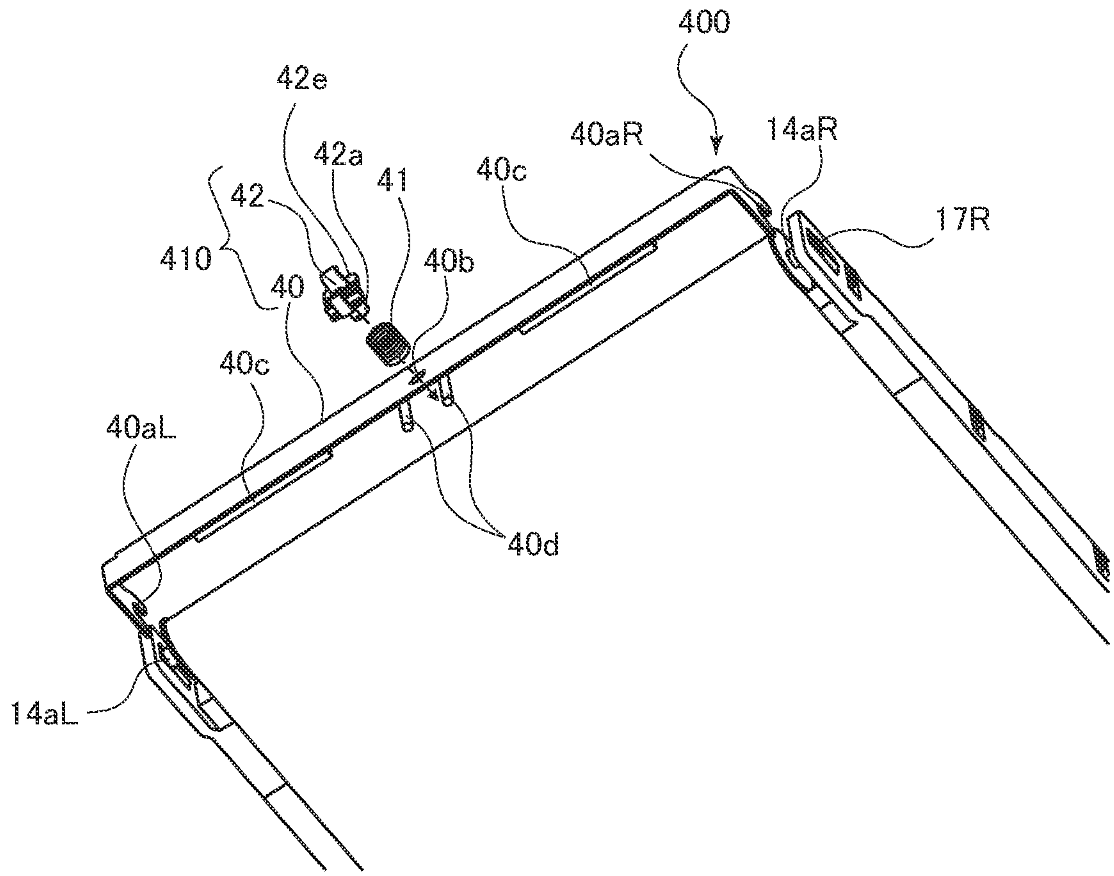
FIG. 10 is a perspective diagram showing a sensor unit.

As shown in FIGS. 2 and 5, the tension roller 14 includes a roller portion 14*b* that contacts the inner peripheral surface of the intermediate transfer belt 11, the left tension roller bearing 17L, and the right tension roller bearing 17R (see FIG. 10). The tension roller bearing 17L has a shaft portion 14*a*L that rotatably supports the roller portion 14*b*. That is, the shaft portion 14*a*L of the tension roller bearing 17L is movable in a direction orthogonal to the axial direction of the shaft portion 14*a*L, and the roller portion 14*b* rotates around the shaft portion 14*a*L and is provided to be movable along the long hole 15*a*L. A tension spring 18 is contracted between the side plate frame 15L and the tension roller bearing 17L, and the tension spring 18 serving as a first biasing unit biases the tension roller 14 toward the inner peripheral surface of the intermediate transfer belt 11. As a result, tension is applied to the intermediate transfer belt 11.

The shaft portion 4*a*L may be a solid shaft or a cylindrical shaft. In the present embodiment, the roller portion 14*b* has a shaft portion extending in the left-right direction and rotatably supported by the cylindrical shaft portion 14*a*L, but may have a hole rotatably supported by the solid shaft portion 14*a*L.

Figure 6:
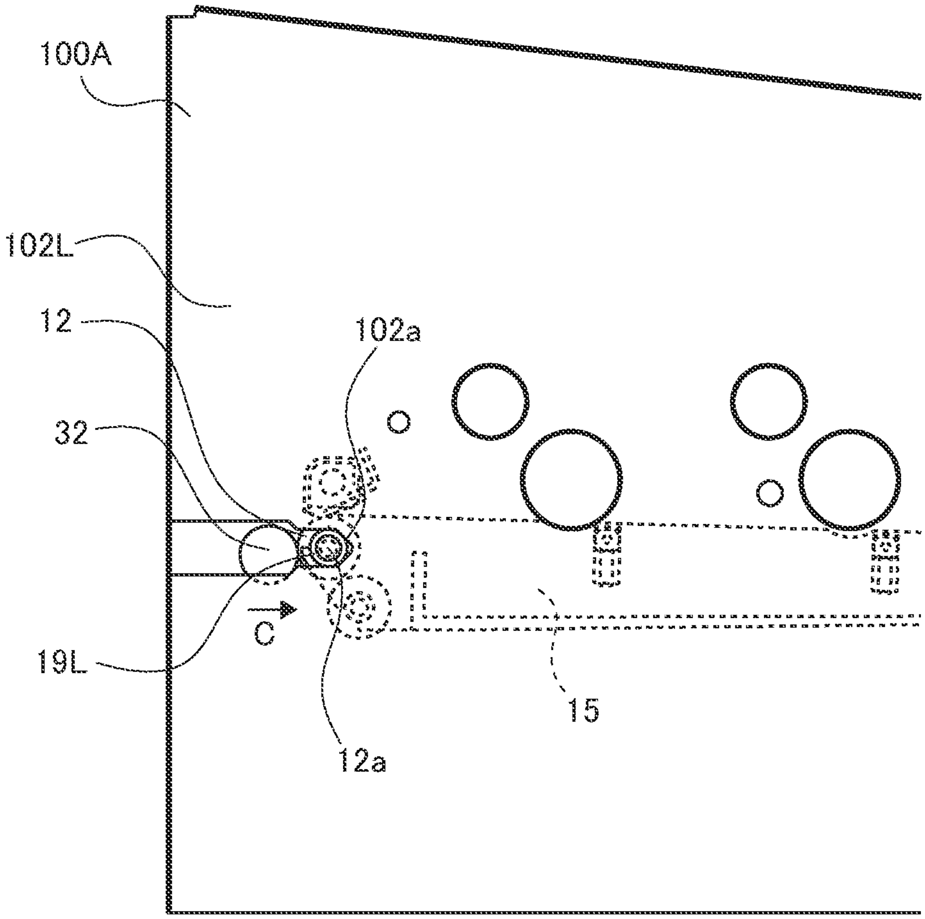
FIG. 6 is a diagram showing a configuration of positioning the intermediate transfer belt unit with respect to the apparatus body on the rear side and the left side of the printer.

FIG. 6 is a diagram showing a configuration of positioning the intermediate transfer belt unit 10 with respect to the apparatus body 100A on the rear side and the left side of the printer 100. As shown in FIG. 6, the driving roller 12 is rotatably supported by the frame member 15 (side plate frame 15L) of the intermediate transfer belt unit 10 via a driving roller bearing 19L. The driving roller 12 serving as a second stretching member is disposed upstream of the tension roller 14 in a drawing direction DD to be described later. The driving roller bearing 19L is engaged with a groove portion 102*a* formed in the left side plate 102L in the vertical direction (up and down direction). Accordingly, intermediate transfer belt unit 10 is positioned in the vertical direction with respect to the apparatus body 100A.

The secondary transfer roller 32 in contact with the driving roller 12 via the intermediate transfer belt 11 is biased in a direction of an arrow C directed in the substantially rear direction by a spring (not shown). The secondary transfer roller 32 presses the driving roller 12 in the direction of arrow C via the intermediate transfer belt 11, and the driving roller bearing 19L contacts the groove portion 102*a*. Accordingly, the intermediate transfer belt unit 10 is positioned in the front-rear direction with respect to the apparatus body 100A.

Figure 7A:
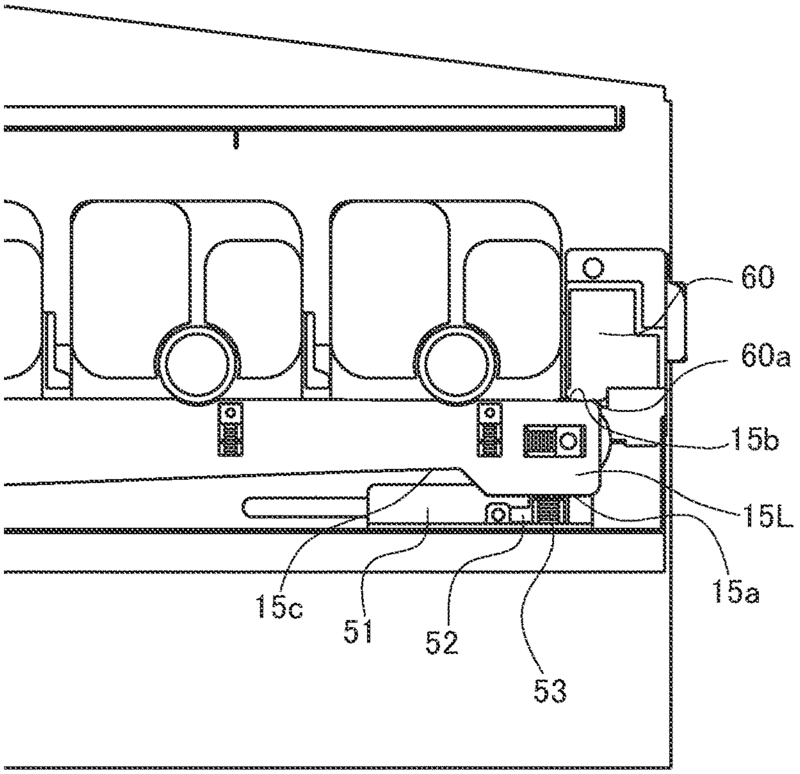
FIG. 7A is a diagram showing an intermediate transfer belt unit positioned at a first position in a state where the front door is closed.
Figure 7B:
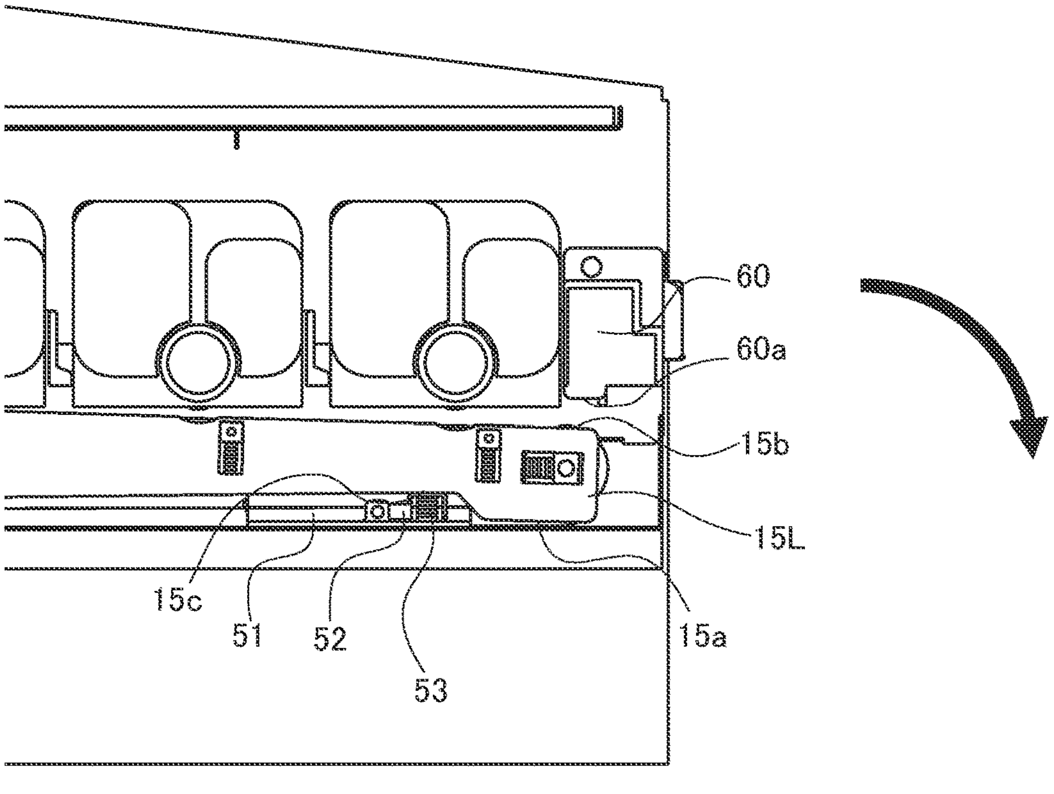
FIG. 7B is a diagram showing the intermediate transfer belt unit positioned at a second position in a state where the front door is opened.

In such a state, the intermediate transfer belt unit 10 is pivotably provided between the first position (see FIG. 7A) and the second position (see FIG. 7B) around a rotation center 12*a* serving as a first pivot axis of the driving roller 12. As shown in FIGS. 7A and 7B, the slide member 51 that slides in conjunction with opening and closing of the front door 50 (see FIG. 4A) as described above is provided with a lever member 52. The lever member 52 is movably supported by the slide member 51 in the vertical direction, and is biased upward by a biasing spring 53. The lever member 52 is disposed below the intermediate transfer belt unit 10, and is configured to be able to contact a first lower face 15*a* and a second lower face 15*c* of the side plate frame 15L of the intermediate transfer belt unit 10. The second lower face 15*c* is positioned above the first lower face 15*a*.

As described above, the slide member 51 is located at the first slide position as shown in FIG. 7A in a state where the front door 50 is closed, and is located at the second slide position as shown in FIG. 7B in a state where the front door 50 is opened. The slide member 51 is provided with the lever member 52 that can be raised and lowered with respect to the slide member 51. When the front door 50 is closed and the slide member 51 is located at the first slide position as shown in FIG. 7A, the lever member 52 contacts the first lower face 15*a* and biases the intermediate transfer belt unit 10 upward by the biasing force of the biasing spring 53.

As a result, the upper face 15*b* of the side plate frame 15L contacts a lower face 60*a* of the cartridge support body 60, and the intermediate transfer belt unit 10 is positioned at the first position. When the intermediate transfer belt unit 10 is located at the first position, the photosensitive drum 1 of each of the process cartridges PY, PM, PC, and PK contacts the intermediate transfer belt 11. Therefore, the printer 100 is in a state in which an image can be formed.

When the front door 50 is opened and the slide member 51 is located at the second slide position as shown in FIG. 7B, the lever member 52 contacts the second lower face 15*c*. The biasing force of the biasing spring 53 is relatively weak, and in a state where the lever member 52 contacts the second lower face 15*c*, the intermediate transfer belt unit 10 is located at the second position below the first position due to the weight of the intermediate transfer belt unit 10. More specifically, the intermediate transfer belt unit 10 pivots downward from the first position to the second position around the rotation center 12*a* (see FIG. 6) of the driving roller 12. When the slide member 51 is located at the second slide position, the lever member 52 may be away from the second lower face 15*c*.

When the intermediate transfer belt unit 10 is located at the second position, the photosensitive drum 1 of each of the process cartridges PY, PM, PC, and PK is away from the intermediate transfer belt 11. Therefore, the printer 100 cannot form an image. When the intermediate transfer belt unit 10 is located at the second position, at least one of the photosensitive drums 1 of the process cartridges PY, PM, PC, and PK may be away from the intermediate transfer belt 11. Then, not all the photosensitive drums 1 need to be away from the intermediate transfer belt 11.

The lifting mechanism of intermediate transfer belt unit 10 is not necessarily formed of the slide member 51. For example, it may be a lifting mechanism by an eccentric cam or a link mechanism.

Further, in the present embodiment, the configuration in which the intermediate transfer belt unit 10 pivots around the rotation center of the driving roller 12 is described, but the entire intermediate transfer belt unit 10 may linearly move in the vertical direction. At this time, it is necessary to release the engagement between the input member to be driven and input to the driving roller 12 and the driving roller 12.

Removal of Process Cartridge

Next, a method of removing the process cartridges PY, PM, PC, and PK will be described with reference to FIGS. 8 to 9B. As the process cartridges PY, PM, PC, and PK are used for image formation, the developer contained in the developing device is consumed. Then, when the developer is consumed to such an extent that it is not possible to form an image of quality satisfactory for the user who has purchased the cartridge, the commercial value of the cartridge is lost.

Therefore, for example, the printer 100 includes a unit that detects the remaining amount of the developer in each of the process cartridges PY, PM, PC, and PK. For a process cartridge in which the detected remaining amount value is smaller than the threshold value for the cartridge life notice or life warning set in advance, a life notice or life warning for the process cartridge is displayed on the display unit. Accordingly, the quality of the output image is maintained by prompting the user to prepare a process cartridge for replacement or to replace the process cartridge.

Figure 8:
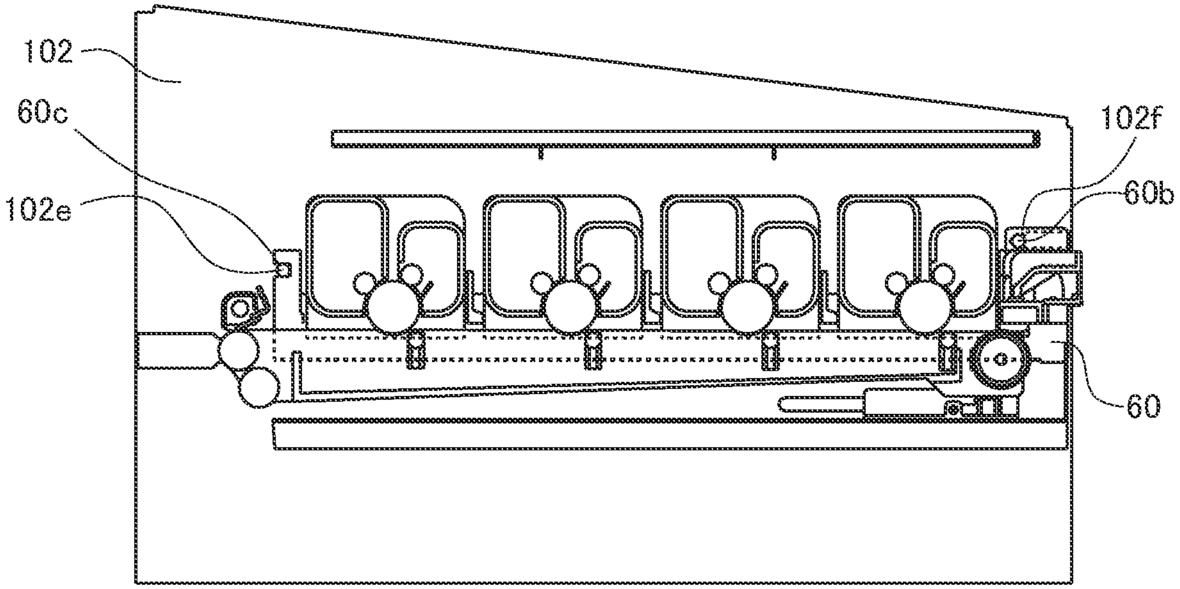
FIG. 8 is a diagram showing a state of a printer at the time of image formation.

As shown in FIGS. 1 and 8, when the front door 50 is closed, the cartridge support body 60 that supports the process cartridges PY, PM, PC, and PK is attached to the apparatus body 100A. At this time, a groove portion 60*c* formed in the rear portion of the cartridge support body 60 is engaged with a positioning shaft 102*e* provided in the body frame 102.

Further, a positioning shaft 60*b* provided at the front portion of the cartridge support body 60 is engaged with a groove portion 102*f* provided in the body frame 102. As a result, the position of the cartridge support body 60 in the vertical direction and the front-rear direction are determined. With the above configuration, the cartridge support body 60 is not displaced even when receiving the biasing force of the biasing spring 53 (see FIG. 7A) via the intermediate transfer belt unit 10.

Figure 9A:
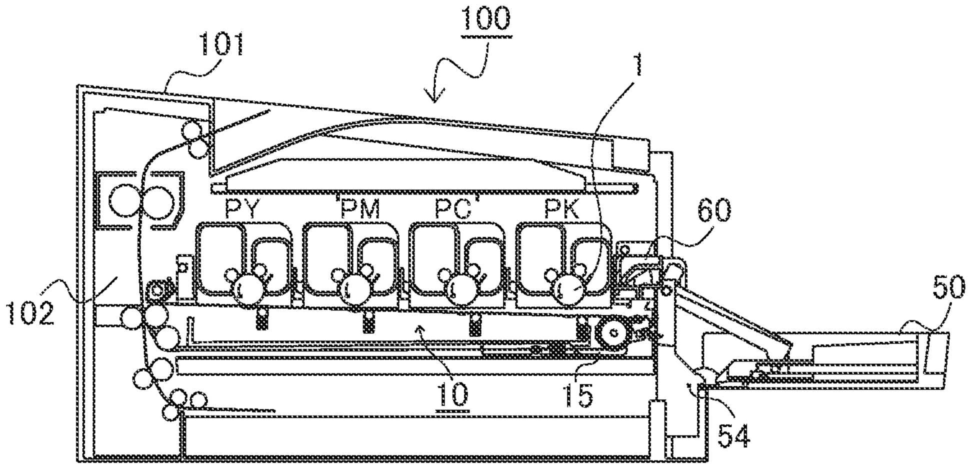
FIG. 9A is a diagram showing the printer in a state in which the front door is opened.

As shown in FIG. 9A, when the front door 50 is opened, the intermediate transfer belt unit 10 moves from the first position to the second position as described above. As a result, a gap is generated between the intermediate transfer belt 11 of the intermediate transfer belt unit 10 located at the second position and each photosensitive drum 1.

Figure 9B:
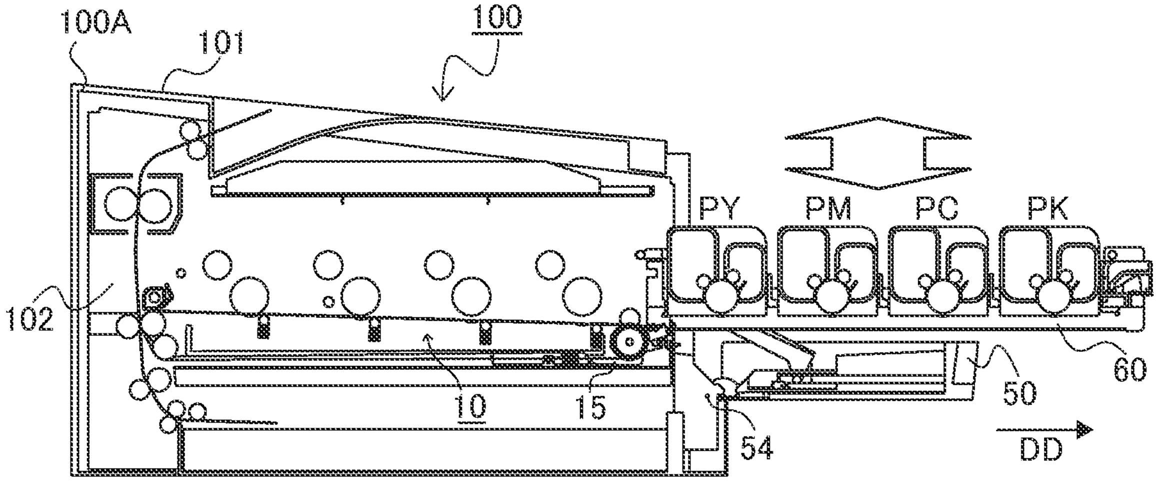
FIG. 9B is a diagram showing a state in which the cartridge support body is drawn out.

Then, as shown in FIG. 9B, the user draws the cartridge support body 60 as the drawer unit in the drawing direction DD out of the apparatus body 100A. The drawing direction DD is a direction from the rear side to the front side of the printer 100. At this time, since there is a gap between the intermediate transfer belt 11 and each photosensitive drum 1, even when the cartridge support body 60 is drawn out, damage to the intermediate transfer belt 11 and each photosensitive drum 1 can be reduced. In a state where the cartridge support body 60 is drawn out from the apparatus body 100A, the process cartridges PY, PM, PC, and PK can be removed upward from the cartridge support body 60.

Configuration of Sensor Unit

Next, a configuration of the sensor unit 400 will be described with reference to FIGS. 10 to 11B. As shown in FIG. 10, the sensor unit 400 serving as a detection unit includes a holding unit 410, a pair of density detection sensors 40*c* serving as a detector, a sensor cable 40*d*, and a sensor spring 41 serving as a second biasing unit. The holding unit 410 includes a holder 40 and a sensor unit support shaft 42 serving as a support portion, and the holder 40 holds the pair of density detection sensors 40*c*. The pair of density detection sensors 40*c* irradiates the intermediate transfer belt 11 with light and receives the reflected light, thereby detecting the density of a toner image such as a toner patch on the intermediate transfer belt 11. The density detection sensor 40*c* and the electric board (not shown) are connected by the sensor cable 40*d*.

The holder 40 extends in the left-right direction and is formed in a substantially U shape. A groove portion 40*a*L engageable with the shaft portion 14*a*L of the tension roller bearing 17L is formed at a first end portion of the holder 40, and a groove portion 40*a*R engageable with a shaft portion 14*a*R of the tension roller bearing 17R is formed at a second end portion of the holder 40. The groove portions 40*a*L and 40*a*R are formed in a substantially U shape. The pair of density detection sensors 40*c* is fixed to the holder 40 so that the light irradiation direction passes through the arc centers of the groove portions 40*a*L and 40*a*R when viewed in the left-right direction.

A sensor unit fulcrum hole 40*b* is formed at the center of the holder 40 in the left-right direction, and a shaft portion 42*a* of the sensor unit support shaft 42 is engaged with the sensor unit fulcrum hole 40*b*. The shaft portion 42*a* is inserted into the sensor spring 41 composed of a coil spring, and the sensor spring 41 is contracted between the sensor unit support shaft 42 and the holder 40.

Figure 11A:
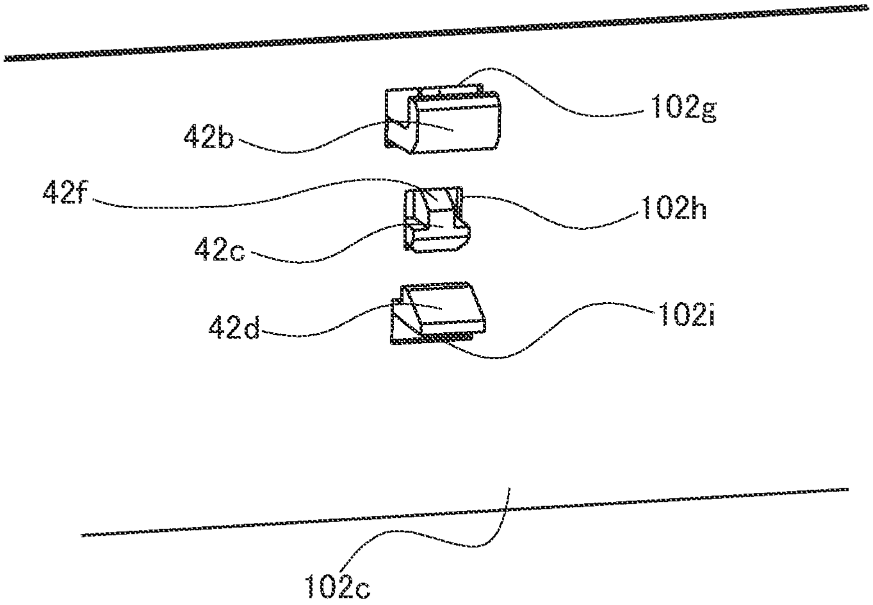
FIG. 11A is a perspective diagram showing a support configuration for a beam of the sensor unit.
Figure 11B:
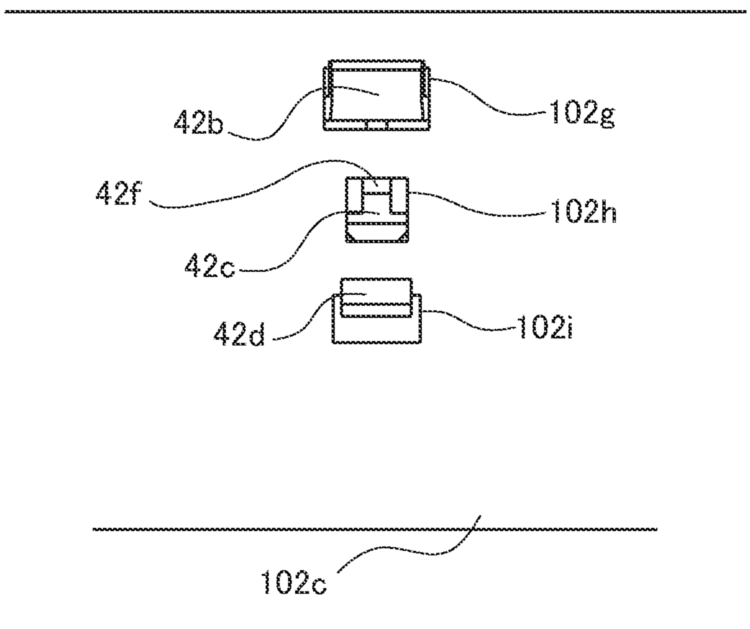
FIG. 11B is a front diagram showing a support configuration for the beam portion of the sensor unit.

As shown in FIGS. 11A and 11B, the sensor unit support shaft 42 includes a first engagement portion 42*b*, a second engagement portion 42*c*, and a third engagement portion 42*d* disposed in the vertical direction. The first engagement portion 42*b*, the second engagement portion 42*c*, and the third engagement portion 42*d* extend rearward from an abutment face 42*e* contacting the holder 40. The beam portion 102*c* (see FIG. 3B) of the body frame 102 has a first hole 102*g*, a second hole 102*h*, and a third hole 102*i* that are vertically aligned.

The first engagement portion 42*b* is formed in a hook shape, is inserted into the first hole 102*g*, and is fitted to the first hole 102*g* in the left-right direction. The second engagement portion 42*c* has a boss shape having a substantially T-shaped cross section, and is fitted to the second hole 102*h* in the left-right direction and the vertical direction. A tapered face 42*f* is formed on the upper face of the second engagement portion 42*c*, and the tapered face 42*f* is inclined downward toward the front of the printer 100. The third engagement portion 42*d* is inserted into the third hole 102*i* and has a claw shape to be engaged with an upper end edge of the third hole 102*i*.

Since the first engagement portion 42*b* and the second engagement portion 42*c* are engaged with the first hole 102*g* and the second hole 102*h*, respectively, the sensor unit support shaft 42 is positioned in the vertical direction and the left-right direction with respect to the beam portion 102*c* of the body frame 102. Note that the third engagement portion 42*d* is a pawl portion for temporary support for preventing the sensor unit support shaft 42 from falling off from the beam portion 102*c* when the printer 100 is assembled, the intermediate transfer belt unit 10 is replaced, or the like. That is, the third engagement portion 42*d* is engaged with the third hole 102*i*, so that the sensor unit support shaft 42 is not separated from the intermediate transfer belt unit 10 when the intermediate transfer belt unit 10 is not attached to the apparatus body 100A.

Figure 12A:
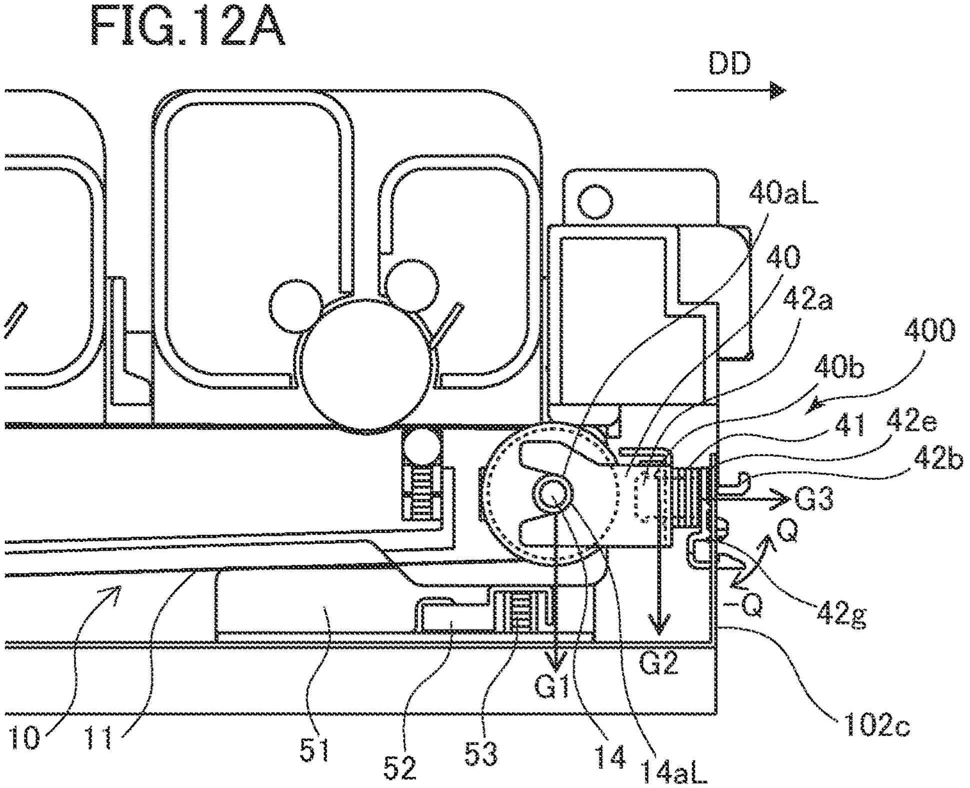
FIG. 12A is a cross-sectional diagram showing a posture of the sensor unit in a state where the intermediate transfer belt unit is located at a first position.

As described above, since the sensor unit support shaft 42 is supported by the beam portion 102*c* of the body frame 102, the sensor spring 41 biases the sensor unit support shaft 42 toward the beam portion 102*c* and biases the holder 40 toward the rear of the printer 100. As a result, the abutment face 42*e* of the sensor unit support shaft 42 is pressed against the beam portion 102*c*, and the sensor unit support shaft 42 is held in a posture in which the abutment face 42*e* and the beam portion 102*c* are in surface contact with each other as shown in FIG. 12A.

The holder 40 is biased by the sensor spring 41 so that the groove portions 40*a*L and 40*a*R are engaged with the shaft portions 14*a*L and 14*a*R, respectively. As a result, in a state where the intermediate transfer belt unit 10 is attached to the apparatus body 100A, the groove portions 40*a*L and 40*a*R of the holder 40 stably are engaged with the shaft portions 14*a*L and 14*a*R. Therefore, the distance between the density detection sensor 40*c* held by the holder 40 and the intermediate transfer belt 11 is guaranteed, and the density detection sensor 40*c* can stably detect the density of the toner patch on the intermediate transfer belt 11. As shown in FIG. 12A, the density detection sensor 40*c* is disposed downstream of the intermediate transfer belt 11 in the drawing direction DD.

As described with reference to FIG. 5, the tension roller 14 is biased forward by the tension spring 18. That is, the biasing direction of the holder 40 by the sensor spring 41 and the biasing direction of the tension roller 14 by the tension spring 18 are opposite to each other. Since the shaft portion 42*a* of the sensor unit support shaft 42 extending in the front-rear direction is inserted into the sensor unit fulcrum hole 40*b* of the holder 40, the holder 40 is movable in the front-rear direction with respect to the sensor unit support shaft 42.

Therefore, the holder 40 can follow the tension roller 14 with the contraction (change in circumferential length) of the intermediate transfer belt 11. In addition, the biasing force of the sensor spring 41 is set to be sufficiently smaller than the biasing force of the tension spring 18, and the sensor spring 41 does not hinder the positional fluctuation of the tension roller 14 due to the contraction (circumferential length change) of the intermediate transfer belt 11.

Following Operation of Sensor Unit

Next, a following operation of the sensor unit 400 when the intermediate transfer belt unit 10 pivots between the first position and the second position will be described with reference to FIGS. 12A and 12B. Hereinafter, only the left side of the sensor unit 400 will be mainly described, and the description of the right side will be omitted.

As described above, in a state where the front door 50 is closed with respect to the apparatus body 100A, as shown in FIG. 12A, the intermediate transfer belt unit 10 is located at the first position. The sensor unit 400 is held in a posture in which the abutment face 42*e* and the beam portion 102*c* are in surface contact with each other by the biasing force of the sensor spring 41.

At this time, as shown in FIGS. 11A and 11B, there is a gap between the first engagement portion 42*b* and the upper end edge of the first hole 102*g* with the first engagement portion 42*b* inserted into the first hole 102*g*. In addition, there is a gap between the third engagement portion 42*d* and the lower end edge of the third hole 102*i*. Furthermore, the tapered face 42*f* is formed on an upper portion of the second engagement portion 42*c*. Therefore, the sensor unit support shaft 42 is pivotably configured in the Q direction around a contact point 42*g* to be described later.

Figure 12B:
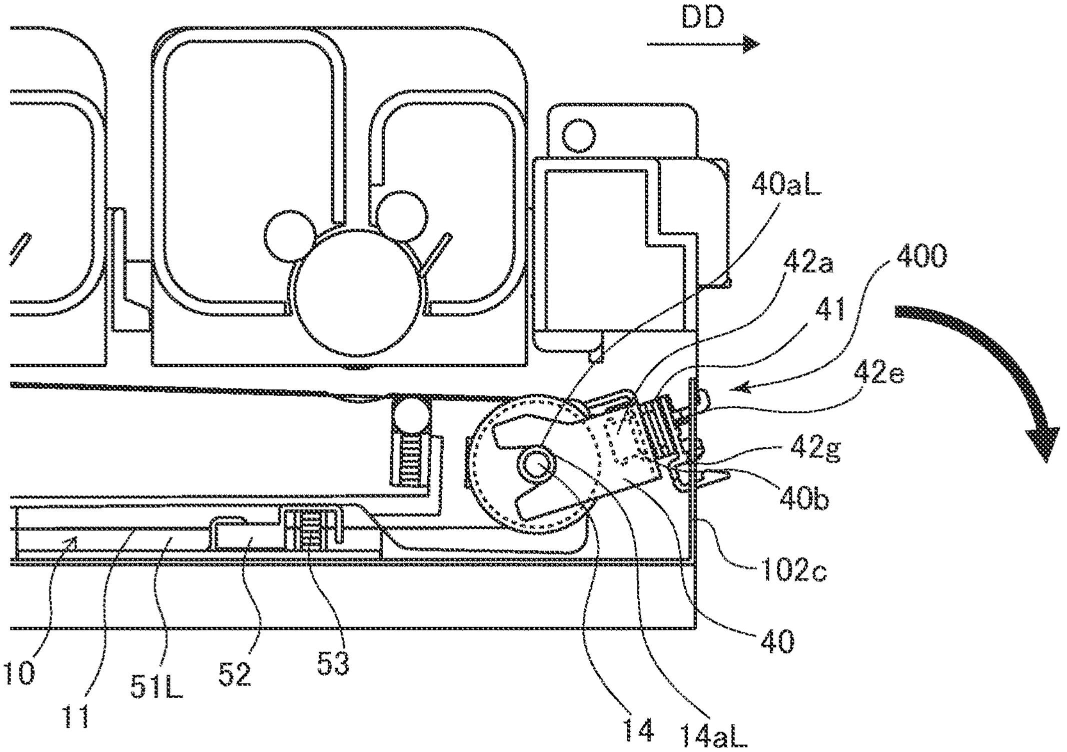
FIG. 12B is a cross-sectional diagram showing a posture of the sensor unit in a state where the intermediate transfer belt unit is located at a second position.

Next, when the front door 50 is opened with respect to the apparatus body 100A, as shown in FIG. 12B, the intermediate transfer belt unit 10 pivots from the first position to the second position around the rotation center 12*a* (see FIG. 6).

At this time, a force G1 in the gravity direction based on the weight of the intermediate transfer belt unit 10 acts on the groove portions 40*a*L and 40*a*R of the holder 40 of the sensor unit 400. A force G2 in the gravity direction based on the weight of the sensor unit 400 acts on the shaft portion 42*a* of the sensor unit support shaft 42 from the sensor unit fulcrum hole 40*b*. Then, a first moment in the Q direction (counterclockwise direction in FIG. 12A) serving as a first direction around the contact point 42*g* at the lower end portion of the abutment face 42*e* acts on the sensor unit 400 by the forces G1 and G2. In addition, a second moment in the −Q direction (clockwise direction in FIG. 12A) serving as a second direction around the contact point 42*g* based on the biasing force G3 of the sensor spring 41 acts on the sensor unit 400. The −Q direction is a direction opposite to the Q direction.

Parameters in the present embodiment are as follows. A distance L1 is a distance from the contact point 42*g* to the force G1 in the front-rear direction. A distance L2 is a distance from the contact point 42*g* to the force G2 in the front-rear direction. A distance L3 is a distance from the contact point 42*g* to the biasing force G3 in the vertical direction.

G1=350 gf
G2=50 gf
G3=250 gf
L1=2.85 cm
L2=0.6 cm
L3=0.6 cm $$\text{The first moment in the } Q \text{ direction}=(G1\times L1)+(G2\times L2)=1027.5 gf\cdot cm$$

$$\text{The second moment in the } -Q \text{ direction}=G3\times L3=150 gf\cdot cm$$

Since the first moment in the Q direction>the second moment in the −Q direction is obtained by setting the above parameters, the sensor unit support shaft 42 pivots in the Q direction around the contact point 42*g* as a fulcrum. The holder 40 is movable in the axial direction of the shaft portion 42*a* with respect to the sensor unit support shaft 42, and is biased by the sensor spring 41, so that the holder moves following the intermediate transfer belt unit 10.

As described above, when the front door 50 is opened with respect to the apparatus body 100A, the intermediate transfer belt unit 10 pivots downward from the first position to the second position around the rotation center 12*a* (see FIG. 6) on the rear side of the printer 100. The sensor unit 400 pivots in the Q direction around the contact point 42*g* in a state in which it is engaged with the shaft portions 14*a*L and 14*a*R of the tension roller bearings 17L and 17R of the intermediate transfer belt unit 10. That is, the intermediate transfer belt unit 10 performs a pivoting operation of pivoting from the first position to the second position around the rotation center 12*a* in conjunction with the opening of the front door 50 with respect to the apparatus body 100A. Then, in conjunction with the pivoting operation of the intermediate transfer belt unit 10, the sensor unit 400 pivots with respect to the body frame 102 around the contact point 42*g* serving as a second pivot axis different from the rotation center 12*a* that is a pivot shaft (first pivot axis) of the intermediate transfer belt unit 10 so as not to hinder pivoting of the intermediate transfer belt unit 10.

At this time, the sensor unit support shaft 42 of the sensor unit 400 is pivotably provided around the contact point 42*g* with respect to the beam portion 102*c* of the body frame 102, and the holder 40 is movably supported in the axial direction of the shaft portion 42*a* with respect to the sensor unit support shaft 42. Further, the holder 40 is biased by the sensor spring 41 so as to maintain a state in which the groove portions 40*a*L and 40*a*R are engaged with the shaft portions 14*a*L and 4*a*R.

Therefore, the sensor unit 400 follows the intermediate transfer belt unit 10 so that the groove portions 40*a*L and 40*a*R do not fall off from the shaft portions 14*a*L and 14*a*R and the sensor unit does not hinder the pivoting (movement) of the intermediate transfer belt unit 10. Therefore, an excessive load is not applied to the intermediate transfer belt unit 10 and the sensor unit 400, and deformation and breakage of the intermediate transfer belt unit 10 and the sensor unit 400 can be reduced.

The sensor unit 400 follows the intermediate transfer belt unit 10 to pivot in the Q direction around the contact point 42*g* so as to be away from the cartridge support body 60. Therefore, the sensor unit 400 does not interfere with the movement of the cartridge support body 60 in the drawing direction DD (see FIG. 9B) in a state where the front door 50 is opened with respect to the apparatus body 100A. In addition, since it is not necessary to replace or remove the sensor unit 400 when replacing the process cartridges PY, PM PC, and PK or the intermediate transfer belt unit 10, cost can be reduced and maintainability can be improved.

Second Embodiment

Next, the second embodiment of the present invention will be described. The second embodiment is configured by providing a belt shift adjustment mechanism 200 in the vicinity of the tension roller of the first embodiment. Therefore, a configuration similar to that of the first embodiment will be described by omitting illustration or attaching the same reference numerals to the drawings.

Tension Unit

Figure 13A:
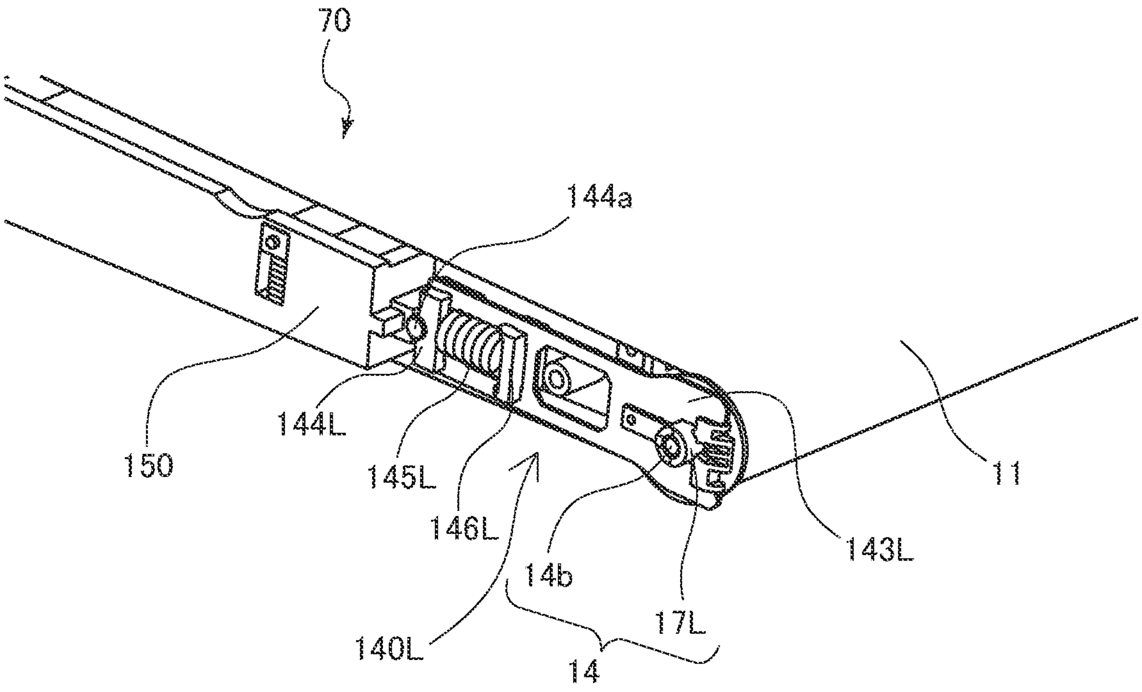
FIG. 13A is a perspective diagram showing an intermediate transfer belt unit according to the second embodiment.
Figure 13B:
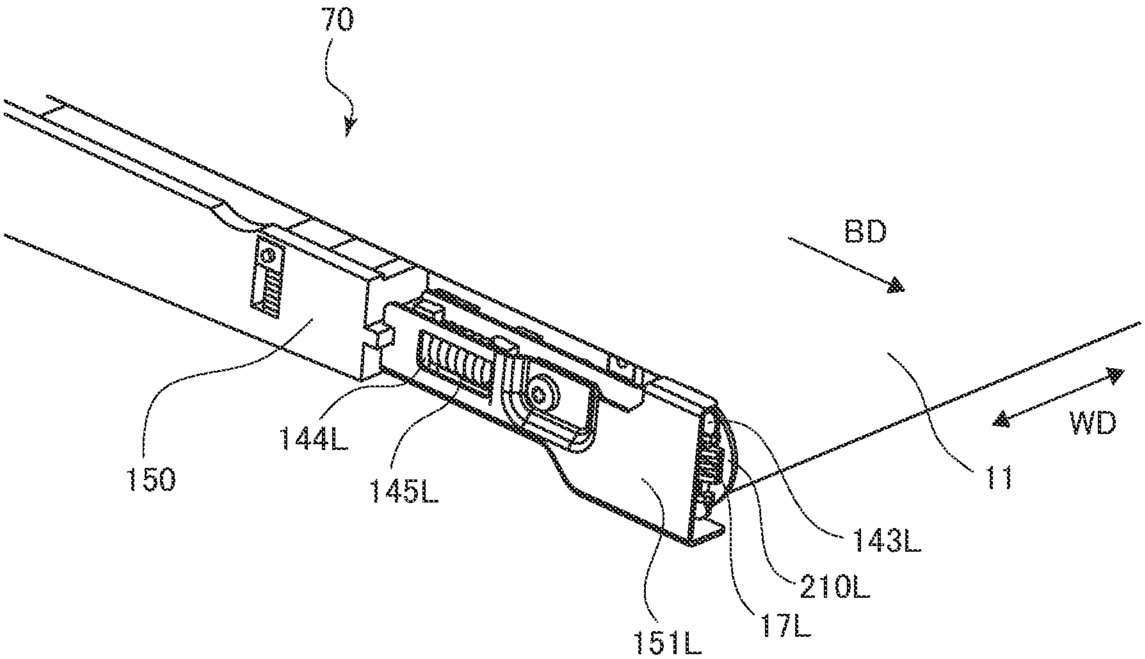
FIG. 13B is a perspective diagram showing a state in which a tension unit is covered with a frame cover.

An intermediate transfer belt unit 70 serving as a belt unit according to the present embodiment includes tension units 140L and 140R and a belt shift adjustment mechanism 200. FIG. 13A is a perspective diagram showing the tension unit 140L that applies tension to the intermediate transfer belt 11. FIG. 13A shows a state in which the frame cover 151L of FIG. 13B is removed. As shown in FIG. 13A, the tension unit 140L includes a tension fulcrum member 144L, a tension stay 143L, a tension spring 145L, and a tension spring receiving member 146L. The tension fulcrum member 144L is pivotably supported by the frame member 150 around a fulcrum shaft 144*a*. The tension spring receiving member 146L is fixed to the tension stay 143L, and the tension spring 145L is contracted between the tension fulcrum member 144L and the tension spring receiving member 146L.

The tension stay 143L is pivotably engaged with the tension roller bearing 17L. Therefore, the roller portion 14*b* is biased toward the inner peripheral surface of the intermediate transfer belt 11 by the tension spring 145L via the tension spring receiving member 146L, the tension stay 143L, and the tension roller bearing 17L. As shown in FIG. 12B, the frame cover 151L is fixed to the frame member 150 by a fastener such as a screw, and the frame cover 151L is disposed outside the tension unit 140L in the left-right direction.

Figure 14:
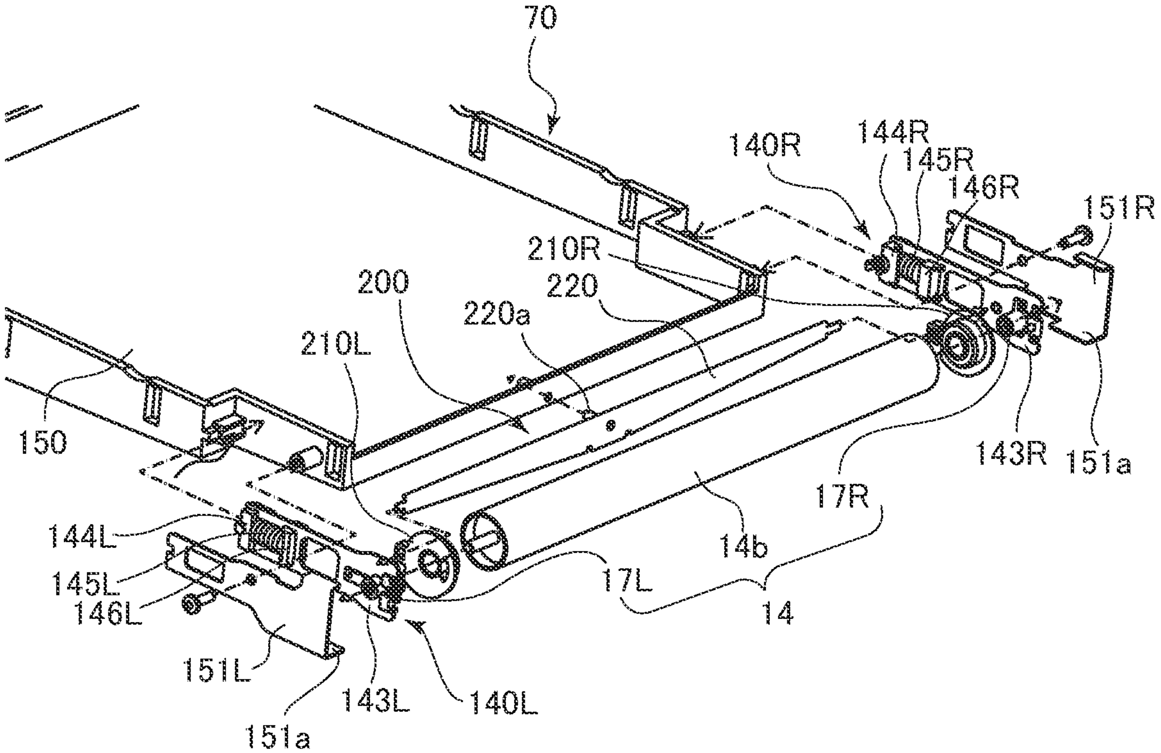
FIG. 14 is an exploded perspective diagram showing a tension unit and a belt shift adjustment mechanism.

As shown in FIG. 14, the tension unit 140R having the same configuration as the tension unit 140L is disposed on the opposite side of the tension unit 140L with the roller portion 14*b* interposed therebetween. That is, the tension unit 140R includes a tension fulcrum member 144R, a tension stay 143R, a tension spring 145R, and a tension spring receiving member 146R. A frame cover 151R is disposed outside the tension unit 140R in the left-right direction.

Belt Shift Adjustment Mechanism

Next, the belt shift adjustment mechanism 200 will be described with reference to FIGS. 14 and 15. The belt shift adjustment mechanism 200 includes adjustment members 210L and 210R disposed at both ends of the roller portion 14*b*, and an interlocking member 220. The adjustment members 210L and 210R serving as a first adjustment member and a second adjustment member are rotatably supported by the tension roller bearings 17L and 17R, respectively, and have a cam face 210*a* eccentric from each of the tension roller bearings 17L and 17R as the rotation centers. Further, the adjustment members 210L and 210R are configured to be able to contact the intermediate transfer belt 11 shifted in the left-right direction, and rotate in a direction same as that of the intermediate transfer belt 11 by a frictional force by contacting the intermediate transfer belt 11.

The interlocking member 220 has a fulcrum shaft 220*a* pivotably supported by the frame member 150, and connects the adjustment members 210L and 210R. The fulcrum shaft 220*a* is disposed at the center between the adjustment members 210L and 210R in the left-right direction. That is, when the interlocking member 220 pivots around the fulcrum shaft 220*a*, the adjustment members 210L and 210R rotate in directions opposite to each other around the tension roller bearings 17L and 17R. Each of the frame covers 151L and 151R is provided with a sliding face 151*a* that can slide on the cam face 210*a* of each of the adjustment members 210L and 210R.

For example, when the intermediate transfer belt 11 is shifted rightward, the adjustment member 210R comes into contact with a first end portion of the intermediate transfer belt 11 to rotate together with the intermediate transfer belt 11. Here, the contact pressure between the adjustment members 210L and 210R and the end portion of the intermediate transfer belt 11 in the left-right direction is referred to as a shift force. Then, the cam face 210*a* of the adjustment member 210R rotates while sliding on the sliding face 151*a* of the frame cover 151R. As a result, a first end portion of the roller portion 14*b* on the side to which the intermediate transfer belt 11 is shifted, that is, the right end is lowered. At the same time, when the interlocking member 220 pivots around the fulcrum shaft 220*a*, the adjustment member 210L pivots in a direction opposite to a direction of the adjustment member 210R. As a result, a second end, that is, the left end portion of the roller portion 14*b* rises.

That is, the tension unit 140R pivots upward around the fulcrum shaft 144*a*, and the tension unit 140L pivots downward around the fulcrum shaft 144*a*, so that the tension roller 14 is inclined with respect to the driving roller 12. In other words, the interlocking member 220 interlocks the adjustment members 210L and 210R to incline the tension roller 14 with respect to the driving roller 12.

When the intermediate transfer belt 11 is shifted leftward, the adjustment member 210L comes into contact with the second end portion of the intermediate transfer belt 11 and receives a shift force from the intermediate transfer belt 11, so that the adjustment member 210L rotates together with the intermediate transfer belt 11. As a result, as described above, the adjustment member 210L is raised with respect to the adjustment member 210R, and the adjustment member 210R is lowered by the interlocking member 220. That is, the interlocking member 220 interlocks the adjustment members 210L and 210R in opposite directions.

Since the intermediate transfer belt unit 70 of the present embodiment attempts to move the intermediate transfer belt 11 in a direction (for example, the left direction) opposite to the initial shift direction (for example, the right direction) by the inclination of the tension roller 14, the shift of the intermediate transfer belt 11 is adjusted to reduce the shift force. Then, once the rotational moments of the adjustment members 210L and 210R are balanced, the adjustment members 210L and 210R stop, and the shift force of the intermediate transfer belt 11 is not generated. That is, the belt shift adjustment mechanism 200 adjusts the shift of the intermediate transfer belt 11 by inclining the tension roller 14 with respect to the driving roller 12 when the belt shift adjustment mechanism 200 is shifted to the first end of the intermediate transfer belt in the width direction W orthogonal to the moving direction BD (see FIG. 13B). The width direction W is parallel to the left-right direction of the printer 100.

Figure 15:
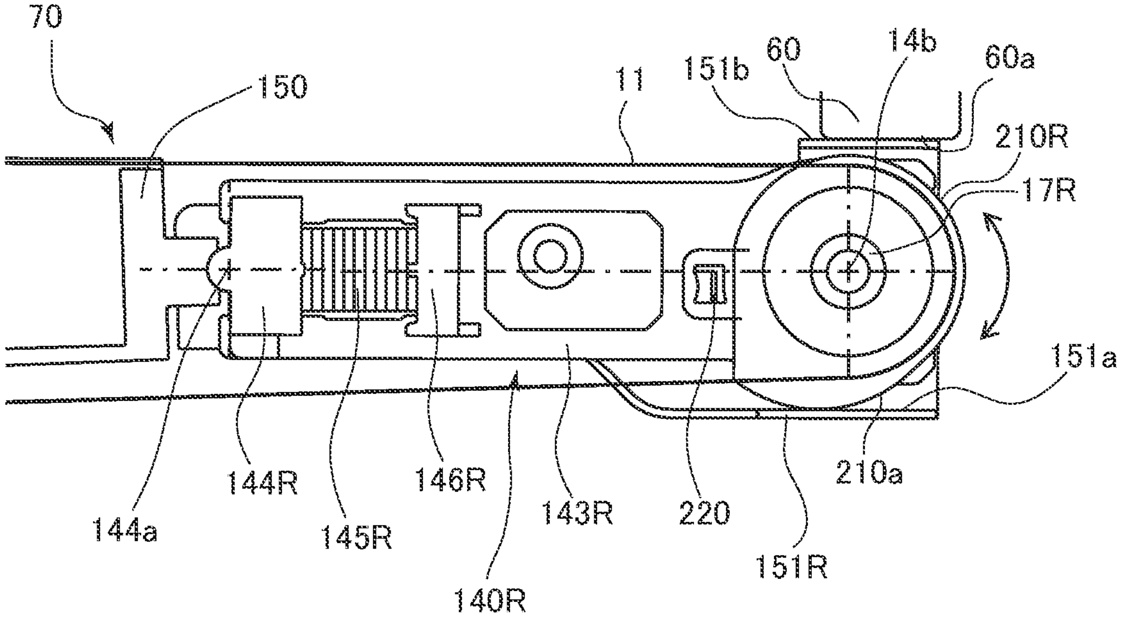
FIG. 15 is a cross-sectional diagram showing a tension unit and a belt shift adjustment mechanism.

In the present embodiment, as shown in FIG. 15, the top face 151*b* of the frame cover 151R (151L) comes into contact with the lower face 60*a* of the cartridge support body 60 at the time of image formation. As a result, the intermediate transfer belt unit 70 is positioned in the height direction, for example, at the first position.

Following Operation of Sensor Unit

Next, a following operation of the sensor unit 400 when the intermediate transfer belt unit 70 pivots between the first position and the second position will be described with reference to FIGS. 16A and 16B. Hereinafter, only the left side of the sensor unit 400 will be mainly described, and the description of the right side will be omitted.

As described above, the belt shift adjustment mechanism 200 is characterized in that the shift force of the intermediate transfer belt 11 is not generated once the rotational moments of the adjustment members 210L and 210R are balanced. As a condition, the cam face 210*a* of each of the adjustment members 210L and 210R need to be in contact with the sliding face 151*a* of each of the frame covers 151L and 151R. When the cam face 210*a* is away from the sliding face 151*a*, the angular phase between the adjustment members 210L and 210R may change, and the alignment of the tension roller 14 may change. Then, a shift force is generated again with respect to the intermediate transfer belt 11, and the image quality may be adversely affected until the shift adjustment of the intermediate transfer belt 11 is completed.

Whether the cam face 210*a* of each of the adjustment members 210L and 210R come into contact with the sliding face 150*a* is determined by a moment around the fulcrum shaft 144*a* generated by the weight of the tension units 140L and 140R and the tension roller 14 and the tension of the intermediate transfer belt 11. In the present embodiment, as shown in FIG. 15, the vector of the tension of the intermediate transfer belt 11 is disposed to face the fulcrum shaft 144*a* of the tension fulcrum shaft 144 so that the moment generated by the tension of the intermediate transfer belt 11 can be ignored. Therefore, the contact state between the cam face 210*a* and the sliding face 150*a* is maintained by the moment generated by the weight of the tension units 140L and 140R and the tension roller 14.

Figure 16A:
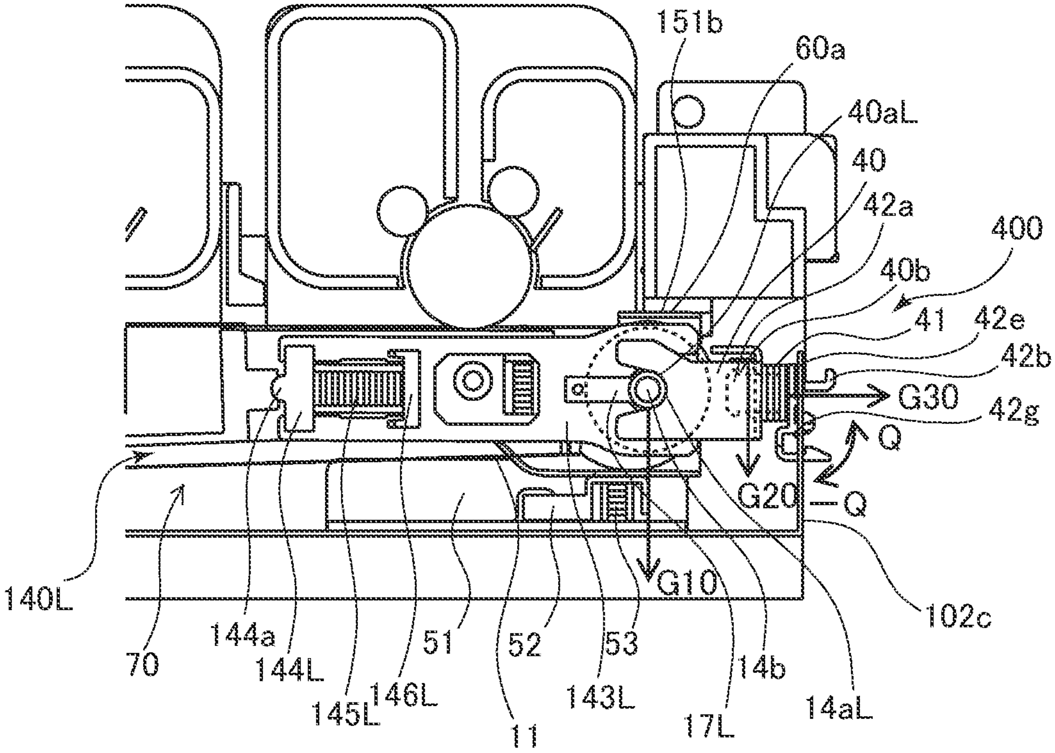
FIG. 16A is a cross-sectional diagram showing a posture of the sensor unit in a state where the intermediate transfer belt unit is located at a first position.

As described above, in a state where the front door 50 is closed with respect to the apparatus body 100A, as shown in FIG. 16A, the intermediate transfer belt unit 70 is located at the first position. The sensor unit 400 is held in a posture in which the abutment face 42*e* and the beam portion 102*c* are in surface contact with each other by the biasing force of the sensor spring 41.

Figure 16B:
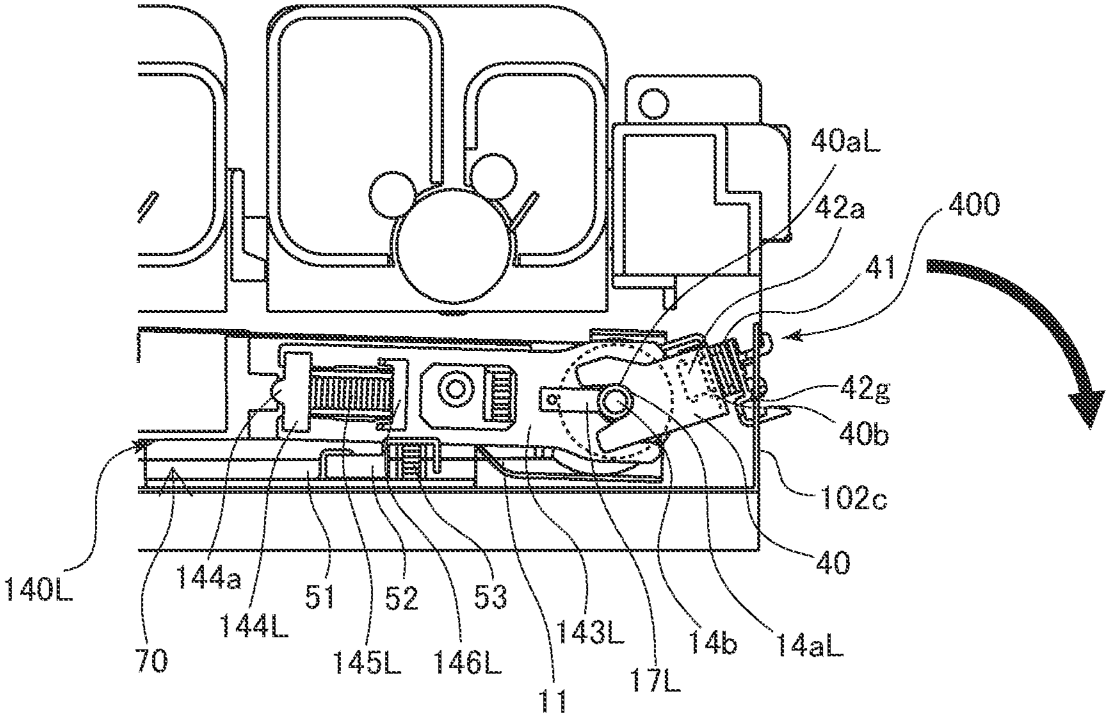
FIG. 16B is a cross-sectional diagram showing a posture of the sensor unit in a state where the intermediate transfer belt unit is located at a second position.

Then, when the front door 50 is opened with respect to the apparatus body 100A, as shown in FIG. 16B, the intermediate transfer belt unit 70 pivots from the first position to the second position around the rotation center 12*a* (see FIG. 6).

At this time, a force G10 in the direction of gravity based on the weight of the tension units 140L and 140R and the weight of the tension roller 14 acts on the groove portions 40*a*L and 40*a*R of the holder 40 of the sensor unit 400. That is, the force G10 is a force in the direction of gravity based on the weight of the intermediate transfer belt unit 70. A force G20 in the direction of gravity based on the weight of the sensor unit 400 acts on the shaft portion 42*a* of the sensor unit support shaft 42 from the sensor unit fulcrum hole 40*b*. Then, a first moment in the Q direction (counterclockwise direction in FIG. 16A) serving as a first direction around the contact point 42*g* at the lower end portion of the abutment face 42*e* acts on the sensor unit 400 by the forces G10 and G20. In addition, a second moment in the −Q direction (clockwise direction in FIG. 16A) serving as a second direction around the contact point 42*g* based on the biasing force G30 of the sensor spring 41 acts on the sensor unit 400. The −Q direction is a direction opposite to the Q direction.

Parameters in the present embodiment areas follows. The distance L1 is a distance from the contact point 42*g* to the force G10 in the front-rear direction. The distance L2 is a distance from the contact point 42*g* to the force G20 in the front-rear direction. The distance L3 is a distance from the contact point 42*g* to the biasing force G30 in the vertical direction.

G10=80 gf
G20=50 gf
G30=250 gf
L1=2.85 cm
L2=0.6 cm
L3=0.6 cm $$\text{The first moment in the } Q \text{ direction}=(G10\times L1)+(G20\times L2)=258gf\cdot cm$$

$$\text{The second moment in the } -Q \text{ direction}=G30\times L3=150gf\cdot cm$$

Since the first moment in the Q direction>the second moment in the −Q direction is obtained by setting the above parameters, the sensor unit support shaft 42 pivots in the Q direction around the contact point 42*g* as a fulcrum. The holder 40 is movable in the axial direction of the shaft portion 42*a* with respect to the sensor unit support shaft 42, and is biased by the sensor spring 41, so that the holder moves following the intermediate transfer belt unit 70.

As described above, when the front door 50 is opened with respect to the apparatus body 100A, the intermediate transfer belt unit 70 pivots downward from the first position to the second position around the rotation center 12*a* (see FIG. 6) on the rear side of the printer 100. The sensor unit 400 pivots m the Q direction around the contact point 42*g* in a state in which it is engaged with the shaft portions 14*a*L and 14*a*R of the tension roller bearings 17L and 17R of the intermediate transfer belt unit 70 including the belt shift adjustment mechanism 200. That is, the sensor unit 400 moves with respect to the body frame 102 so as not to hinder pivoting of the intermediate transfer belt unit 70 in conjunction with the pivoting operation in which the intermediate transfer belt unit 70 moves from the first position to the second position.

Therefore, the sensor unit 400 follows the intermediate transfer belt unit 70 so that the groove portions 40*a*L and 40*a*R do not fall off from the shaft portions 14*a*L and 14*a*R and the sensor unit does not hinder the pivoting of the intermediate transfer belt unit 70. Therefore, an excessive load is not applied to the intermediate transfer belt unit 70 and the sensor unit 400, and deformation and breakage of the intermediate transfer belt unit 70 and the sensor unit 400 can be reduced.

The sensor unit 400 follows the intermediate transfer belt unit 70 while the cam face 210*a* of each of the adjustment members 210L and 210R of the belt shift adjustment mechanism 200 maintain contact with the sliding face 151*a* of each of the frame covers 151L and 151R. Therefore, a toner image with stable image quality can be formed on the sheet.

Other Embodiments

In any of the embodiments described above, the holder 40 of the sensor unit 400 is engaged with the shaft portions 14*a*L and 14*a*R of the tension roller bearings 17L and 17R, but the present invention is not limited thereto. For example, the holder 40 may be engaged with another portion of the intermediate transfer belt unit. In addition, the holder 40 may be engaged with a link member or the like interlocked with the pivoting operation of the intermediate transfer belt unit.

In any of the embodiments described above, the holder 40 has the groove portions 40*a*L and 40*a*R engageable with the shaft portions 14*a*L and 14*a*R of the tension roller bearings 17L and 17R, but the present invention is not limited thereto. For example, each of the tension roller bearings 17L and 17R may have a groove portion, and the holder 40 may have a shaft portion engaged with the groove portion.

In any of the embodiments described above, the intermediate transfer belt units 10 and 70 are configured to move between the first position and the second position in conjunction with opening and closing of the front door 50, but the present invention is not limited thereto. For example, the intermediate transfer belt units 10 and 70 may be further manually moved by the user after the front door 50 is opened by the user.

In any of the embodiments described above, the process cartridges PY, PM, PC, and PK are collectively drawn out in the drawing direction DD by the cartridge support body 60, but the present invention is not limited thereto. For example, the process cartridges PY, PM, PC, and PK may be configured to be individually detachable from the apparatus body 100A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-064112, filed Apr. 7, 2022, which is hereby incorporated by reference herein in its entirety.

What is claimed is:

1. An image forming apparatus comprising:

an apparatus body having a body frame;

an image bearing member configured to bear a toner image;

a belt unit including:

a belt that is a rotatable endless belt and to which the toner image borne on the image bearing member is primarily transferred; and a stretching member configured to stretch the belt;

a transfer unit configured to transfer the toner image borne on the belt to a sheet; and a detection unit movably supported by the body frame and configured to detect the toner image on the belt, wherein the belt unit is pivotable around a first pivot axis between a first position where the belt and the image bearing member are in contact with each other and a second position where the belt is away from the image bearing member, and the detection unit engages the belt unit and is configured to pivot around a second pivot axis different from the first pivot axis with respect to the body frame so that the detection unit follows a pivoting operation in which the belt unit pivots from the first position to the second position.

2. The image forming apparatus according to claim 1, wherein the detection unit includes:

a detector configured to detect the toner image transferred to the belt; and a holding unit configured to hold the detector, be engaged with the stretching member, and follow a movement of the stretching member in a case in which the belt unit performs the pivoting operation.

3. The image forming apparatus according to claim 2, wherein the holding unit includes a support portion pivotably supported by the body frame, the support portion has a contact point in contact with the body frame, and the detection unit is configured to pivot around the contact point as the second pivot axis so as not to hinder pivoting of the belt unit in a case in which the belt unit performs the pivoting operation.

4. The image forming apparatus according to claim 3, wherein the belt unit includes a frame member, the stretching member includes:

a roller portion configured to contact an inner peripheral surface of the belt; and a shaft portion supported by the frame member and configured to rotatably support the roller portion, the holding unit includes a holder movably supported by the support portion and configured to hold the detector, and the holder has a groove portion engaged with the shaft portion.

5. The image forming apparatus according to claim 4, wherein the shaft portion is movably supported by the frame member in a direction orthogonal to an axial direction of the shaft portion.

6. The image forming apparatus according to claim 5, wherein the belt unit includes a first biasing unit configured to bias the stretching member toward the inner peripheral surface of the belt, the detection unit includes a second biasing unit configured to bias the holder such that the groove portion is engaged with the shaft portion, and a biasing force of the second biasing unit is weaker than a biasing force of the first biasing unit.

7. The image forming apparatus according to claim 6, wherein a moment in a first direction around the contact point based on a weight of the belt unit and a weight of the detection unit is larger than a moment in a second direction, opposite to the first direction, around the contact point based on a biasing force of the second biasing unit.

8. The image forming apparatus according to claim 1, further comprising:

a door portion openably and closably supported by the apparatus body; and an interlocking portion configured to cause the belt unit to perform the pivoting operation in conjunction with opening of the door portion with respect to the apparatus body.

9. The image forming apparatus according to claim 2, further comprising:

a cartridge including the image bearing member; and a drawer unit that is configured to support the cartridge and is drawable in a drawing direction with respect to the apparatus body, wherein the detector of the detection unit is disposed downstream of the belt in the drawing direction.

10. The image forming apparatus according to claim 9, wherein the stretching member is a first stretching member, and the belt unit includes a second stretching member disposed upstream of the first stretching member with respect to the drawing direction, the second stretching member stretching the belt together with the first stretching member, the belt unit being pivotable between the first position and the second position around a rotation center, as the first pivot axis, of the second stretching member.

11. The image forming apparatus according to claim 10, further comprising a belt shift adjustment mechanism configured to adjust a shift of the belt by inclining the first stretching member with respect to the second stretching member in a case in which the belt is shifted to a first end side in a width direction orthogonal to a moving direction of the belt.

12. The image forming apparatus according to claim 11, wherein the belt shift adjustment mechanism includes:

a first adjustment member configured to move by receiving a force from a first end portion, in the width direction, of the belt;

a second adjustment member configured to move by receiving a force from a second end portion, in the width direction, of the belt; and an interlocking member configured to connect the first adjustment member and the second adjustment member and interlock the first adjustment member and the second adjustment member in opposite directions.

13. The image forming apparatus according to claim 1, wherein the second pivot axis extends along the first pivot axis.

14. The image forming apparatus according to claim 2, wherein the holding unit includes a first engaging portion and a second engaging portion, the first engaging portion engaging one end portion of the stretching member, the second engaging portion engaging the other end portion of the stretching member, and wherein the detection unit is supported by the body frame so that the first engaging portion and the second engaging portion follow the movement of the stretching member in the case where the belt unit performs the pivoting operation.

15. An image forming apparatus comprising:

an apparatus body having a body frame;

an image bearing member configured to bear a toner image;

a belt unit including:

a belt that is a rotatable endless belt and to which the toner image borne on the image bearing member is primarily transferred;

a first stretching member and a second stretching member configured to stretch the belt; and a belt shift adjustment mechanism configured to adjust a shift of the belt by inclining the first stretching member with respect to the second stretching member;

a transfer unit configured to transfer the toner image borne on the belt to a sheet; and a detection unit movably supported by the body frame and configured to detect the toner image on the belt, wherein the belt unit is movable between a first position where the belt and the image bearing member are in contact with each other and a second position where the belt is away from the image bearing member, and the detection unit is engaged with the first stretching member in a state in which the belt unit is located at the first position, and moves with respect to the body frame so that the detection unit follows a moving operation in which the belt unit moves from the first position to the second position.

16. The image forming apparatus according to claim 15, wherein the belt shift adjustment mechanism includes:

a first adjustment member configured to move by receiving a force from a first end portion, in a width direction orthogonal to a moving direction of the belt, of the belt;

a second adjustment member configured to move by receiving a force from a second end portion, in the width direction, of the belt; and an interlocking member configured to connect the first adjustment member and the second adjustment member and interlock the first adjustment member and the second adjustment member in opposite directions.

17. The image forming apparatus according to claim 16, wherein in a case where the belt is shifted to a first end side in the width direction, the first adjustment member is raised by receiving a force from the first end portion of the belt, and the second adjustment member is lowered by the interlocking member.

18. The image forming apparatus according to claim 15, wherein the detection unit includes:

a detector configured to detect the toner image transferred to the belt; and a holding unit configured to hold the detector, be engaged with the first stretching member, and follow a movement of the first stretching member in a case where the belt unit performs the moving operation.

19. The image forming apparatus according to claim 18, further comprising:

a cartridge including the image bearing member; and a drawer unit that is configured to support the cartridge and is drawable in a drawing direction with respect to the apparatus body, wherein the detector of the detection unit is disposed downstream of the belt in the drawing direction.

20. The image forming apparatus according to claim 19, wherein the second stretching member is disposed upstream of the first stretching member in the drawing direction.

21. The image forming apparatus according to claim 15, wherein the belt unit is pivotable between the first position and the second position around a rotation center of the second stretching member, and the detection unit is pivotable around a contact point with the body frame in conjunction with the moving operation of the belt unit.

22. The image forming apparatus according to claim 15, further comprising:

a door portion openably and closably supported by the apparatus body; and an interlocking portion configured to cause the belt unit to perform the moving operation in conjunction with opening of the door portion with respect to the apparatus body.

23. The image forming apparatus according to claim 15, wherein the belt unit is pivotable around a first pivot axis between the first position and the second position, wherein the detection unit is configured to pivot around a second pivot axis different from the first pivot axis with respect to the body frame, and the second pivot axis extends along the first pivot axis.

24. The image forming apparatus according to claim 18, wherein the holding unit includes a first engaging portion and a second engaging portion, the first engaging portion engaging one end portion of the first stretching member, the second engaging portion engaging the other end portion of the first stretching member, and wherein the detection unit is supported by the body frame so that the first engaging portion and the second engaging portion follow the movement of the first stretching member in the case where the belt unit performs the moving operation.

* * * * *